United States Patent [19]

Highberger

[11] 4,021,783
[45] May 3, 1977

[54] PROGRAMMABLE CONTROLLER

[75] Inventor: Gary G. Highberger, Painesville, Ohio

[73] Assignee: Reliance Electric Company, Cleveland, Ohio

[22] Filed: Sept. 25, 1975

[21] Appl. No.: 616,860

[52] U.S. Cl. .................................... 340/172.5
[51] Int. Cl.² ................... G05C 19/24; G06F 3/04
[58] Field of Search ................. 445/1; 340/172.5

[56] References Cited

UNITED STATES PATENTS

| | | | |
|---|---|---|---|
| 3,343,135 | 9/1967 | Freiman et al. | 340/172.5 |
| 3,573,851 | 4/1971 | Watson et al. | 340/172.5 |
| 3,596,258 | 7/1971 | Choate et al. | 340/172.5 |
| 3,611,311 | 10/1971 | Andrews | 340/172.5 |
| 3,614,741 | 10/1971 | McFarland et al. | 340/172.5 |
| 3,644,898 | 2/1972 | Post | 340/172.5 |
| 3,701,113 | 10/1972 | Chace et al. | 340/172.5 |
| 3,714,634 | 1/1973 | Dirks et al. | 340/172.5 |
| 3,737,861 | 6/1973 | O'Neill | 340/172.5 |
| 3,741,246 | 6/1973 | Braytenbahl | 340/172.5 |
| 3,744,028 | 7/1973 | Kirk | 340/172.5 |
| 3,753,243 | 8/1973 | Ricketts et al. | 340/172.5 |
| 3,806,714 | 4/1974 | Otsuka et al. | 340/172.5 |
| 3,810,104 | 5/1974 | Markley | 340/172.5 |
| 3,825,900 | 7/1974 | Anderson | 340/172.5 |
| 3,827,030 | 7/1974 | Seipp | 340/172.5 |
| 3,875,391 | 4/1975 | Shapiro et al. | 340/172.5 |
| 3,900,834 | 8/1975 | Casey et al. | 340/172.5 |
| 3,909,791 | 9/1975 | VanDenBerg | 340/172.5 |

Primary Examiner—Mark E. Nusbaum
Assistant Examiner—Jan E. Rhoads
Attorney, Agent, or Firm—Wayne M. Harding

[57] ABSTRACT

A programmable system controller stores in memory a sequence of program words directly simulating a planar ladder diagram characterizing the desired operation of a controlled system. The ladder diagram is a set of n rung-by-m column arrays of contacts interconnected with particular controlled devices of the system. The program words are read out of the memory in a sequence to directly represent the ladder diagram on a rung-by-rung basis for each column. The controller includes an interface unit coupled to a set of input switches for providing switch signals that are indicative of the operating status of the machine. A data processing unit is provided with an accumulator having a plurality of at least n storage units respectively corresponding to each rung of the ladder diagram. In response to the program words and to the switch signals, the accumulator sequentially determines the states of the storage units according to whether the switch signals are indicative that a particular rung of one column of the ladder diagram can contribute towards operating the controlled device as it is connected in the ladder diagram. After the plurality of storage units have been conditioned according to the rungs in one column, the next column of the ladder diagram is considered for conditioning the storage units. After all columns of the ladder diagram have been considered, a preselected one of the plurality of storage units contains an output signal indicative of whether the controlled device should be operated.

A more specific feature of the controller is the interface circuit which alternately provides asynchronous or synchronous input of the switch signals using a partitioned random access memory as a novel buffer register.

41 Claims, 17 Drawing Figures

PROGRAMMABLE CONTROLLER

BACKGROUND OF THE INVENTION

1. Field of the Invention

This invention relates in general to system controllers and more particularly relates to programmable system controllers which store a set of program words for controlling the operating sequence of a controlled system.

Operation of many types of systems is conditional and sequential. For example, machine tools and chemical and manufacturing processes are conventionally operated to perform in a desired sequence of related steps. Execution of one step may be conditioned upon completion of a previous step, or may be conditioned upon other predetermined conditions whose status is indicated by mechanical limit switches, pressure or temperature sensing devices, contacts of relays, etc. Devices such as relays, solenoids, and indicators are controlled according to the sensed conditions for initiating the execution of the given step.

2. Prior Art

Prior to the introduction of so-called programmable logic controllers, operation of such systems was conventionally controlled by electrical circuits which were wired together in particular circuit configurations to cause the system to perform according to the dictates of the circuits. That is, the circuits dictated a desired operating sequence of the controlled system. For example, a bank of relays and their contacts were wired into a circuit network. A first set of system conditions, as detected by a particular combination of contacts, would operate a first relay which would initiate and/or terminate a step performed by the system and bring a second relay and another combination of contacts into play. When the sensed system conditions satisfied the configurations of the second set of contacts, a second relay would be actuated which would bring a third combination of contacts into play, and so forth.

Relay control circuitry of this type had many drawbacks. For example, physically interconnecting the relays and the relay contacts was time-consuming and expensive. If the circuitry malfunctioned, repairs not only were time-consuming but also usually required the services of a skilled trouble-shooter. Perhaps most importantly, because the contacts were wired to the relays the controlled systems were not versatile. Changes in the sequence of system operations could be accomplished neither easily not rapidly because the control circuitry had to be rewired each time the system was to be called upon to perform different operations.

Many of these drawbacks were overcome by the relatively recent introduction of programmable controllers. These programmable controllers were computer-like devices having a memory unit. They directly controlled the relays or other controlled devices of the controlled system in accordance with a sequence of instructions programmed into the memory unit and according to detection of actual system conditions sensed by particular sensors. A set of switches was provided to sense and indicate the system conditions. The switches and relays were all connected to the controllers but the switches and relays did not need to be connected to each other. Thus, the instructions programmed into the memory could be altered to produce a different operating sequence of the controlled system without requiring any physical rewiring of relays or switches. The controllers also typically have replaceable interface units for versatility in controlling different types of systems.

In order to arrive at appropriate instructions for programming the memory units, it was necessary, in some prior art proposals, for a skilled individual to derive mathematical expressions which characterized a desired sequence of system operations in terms of system operating conditions detected by selected ones of the switches. The mathematical expression then had to be converted, usually by a skilled programmer, into a sequence of operating steps or instruction, known as an algorithm, which represented the mathematical expression in a form which the controller could respond to. The algorithm was stored in the memory unit to program the controller to determine whether actually sensed system operating conditions were requisite to satisfy the mathematical expression represented by the algorithm. If requisites of one portion of the algorithm were satisfied by sensed system conditions, the controller operated an appropriate relay (or other controlled device) so that a system operation was initiated or terminated. Successive system operations were controlled in the manner described when succeeding portions of the algorithm were satisfied.

In one programmable controller of the type referred to, the mathematical expression took the form of a series of Boolean logic equations written in terms of given states of selected switches, and the switches and the controlled devices were respectively assigned reference or locations numbers. Switch signals representing the states of the switches were input into the controller in such a manner that specific switch signals could be selected and their values determined by specifying the respective reference numbers.

An algorithm representing the Boolean logic equations was created and programmed into memory to operate the controller to sequentially interrogate the switches specified in each successive equation. The interrogation determined whether the value of each specified switch signal was that value which would be needed to satisfy the logic equation. A single bit status register was provided in this controller for storing the results of each interrogation. The status register was set into a certain state dictated by the logic of the equation after interrogation of each of the specified switch signals. Accordingly, after completion of the sequence of interrogations, the state of the status register indicated whether the Boolean logic equation had been satisfied and thus whether the controlled device should have been actuated.

This type of programmable logic controller having a single bit register required special programming, known as jump instructions, in the algorithm for solving all but elementary Boolean logic equations. Because the mathematical expression was expressed in terms of a Boolean logic equation, the expression could be satisfied by considering less than all the logic terms in the expression. For example, a Boolean equation consisting of three logically "ORed" terms was satisfied if any one of the "OR" terms was satisfied. This special programming complicated programming procedures and, accordingly, to avoid this complication, an embodiment of the proposed logic controller provided an intermediate storage device in addition to the status register. The intermediate storage device was used to indicate whenever a sequence of interrogated switch signals satisfied the logic equation even though interrogations corresponding to less than all of the terms of the equation had been performed.

This described controller required (1) a logician for deriving the Boolean mathematical expression which characterized the desired operating sequence of the controlled system; and (2) a skilled programmer for producing the stored algorithm which directed the controller to monitor the operating conditions of the system and to determine whether the operating conditions were those which satisfied the logic of the Boolean expression. This required the programmer to be skilled in Boolean algebra in order to determine the state in which the status register should be conditioned after each interrogation. Specifically, "true" interrogations condition the status register in a state according to whether the interrogation was for a logic OR or a logic AND term in the equation. These requirements for the programmer increased overall system costs and decreased system versatility.

In another prior art logic controller, an algorithm in a program memory was generated through use of a special programming panel supplied with the controller. A special master program which was preprogrammed into the memory was also supplied with the controller. The master program and the programming panel were coordinated to produce the algorithm which would represent a desired operating condition of the system.

In preparation for entering instructions into the programming panel, a ladder diagram was simulated for characterizing desired operation of the controlled system. A presentation of this ladder diagram was entered into the programming panel. The ladder diagram entry was converted into the algorithm as dictated by the master program. The algorithm was then entered into the program memory of the controller.

A bank of data stores was provided in this controller for storing values of signals representing states of the switches of the controlled system. The algorithm produced by the master program and the programming panel as a result of the entry of the ladder diagram effected comparison of these signals with the values stored in the data bank for determining whether a controlled device should be operated.

In an attempt to provide such a controller which could be programmed without the services of a skilled programmer, this prior art controller required a sophisticated special programming panel and master program. Needless to say these features increased system costs and increased overall complexity of the programmable controller.

More detailed descriptions of the above prior programmable logic controllers, as well as other programmable controllers, are found in Lapidus, "Programmable Logic Controllers - Painless Programming to Replace the Relay Bank," CONTROL ENGINEERING, pp. 48–60, April, 1971.

SUMMARY OF THE INVENTION

The present invention provides a novel and improved high speed programmable controller and method for controlling systems whose desired operation may be characterized by a planar ladder diagram. A stored sequence of program words directly simulates the planar ladder diagram on a rung-by-rung, column-by-column basis, and a processing unit is provided having a plurality of storage units respectively corresponding to the rungs of the ladder diagram. The use of the direct simulation of the planar ladder diagram and the storage units obviates any need for a mathematical expression, such as Boolean logic equations, characterizing desired machine operation, thereby obviating any requirement for highly specialized skills on the part of the person programming the controller. Any need for a sophisticated programming panel and a master program for converting inputs from the person programming the controller into a form acceptable by the controller is also avoided. These features increase versatility of the programmable controller as well as reduce overall costs.

According to a preferred embodiment of the invention, the controller selectivity operates one or more controlled devices in the controlled system in response to the operating status of a set of normally open input switches connected in the system. A system interface is coupled to the set of input switches for deriving switch signals which are indicative of the operating status of the respective switches. The controller includes program storage for storing and providing a sequence of program words which are indicative of a desired operating sequence of the devices in the controlled system. A data processing unit is provided for producing an output signal for actuating the selected controlled device in response to the sequence of program words and to the switch signals.

A feature of the present invention is the program storage which has a program memory programmed with a sequence of program words to directly characterize the ladder diagram; i.e., the connection between a pair of rails and in an $n$-rung-by-$m$ column array of a plurality of normally open or normally closed contacts with the selected controlled device. The $n$-by-$m$ array of contacts characterizes the structure of the controlled system and is indicative of how the controlled device would operate if the contacts were directly wired to it. Each pair of contacts in the ladder diagram, regardless of whether the contacts are normally open or normally closed, has an associated normally open input switch in the set of input switches which produce the switch signals.

There is one $n$-by-$m$ array for each controlled device which must be actuated in the desired sequence of operation. Accordingly, the program memory stores and produces sequences of program words representing these arrays in one scan cycle for controlling several devices or stages of operation of the controlled system. The scan cycles are periodic, and subsequent scan cycles are immediately initiated after completion of a previous cycle.

The sequence of program words which define the array include input words representing (1) the normal states of the contacts and (2) an address location for identifying the respective switches associated with the contacts; process words representing the particular interconnection of the contacts in the array; and output words representing the address location of a selected controlled device, where occurrence of the output word represents the interconnection of the selected controlled device with the contacts in the array. The sequence of program words stored in the program memory thereby directly characterizes the ladder diagram on a rung-by-rung basis for each of the respective columns.

According to another feature of the invention, the data processing unit includes an accumulator and a timing generator which are responsive to the sequence of program words and to the switch signals. The timing generator sequentially conditions the accumulator on a rung-by-rung basis and then on a column-by-column basis in accordance with whether the switch signals associated with the contacts in the corresponding planar ladder diagram are such that the ladder diagram would operate the controlled device. The state of the respective input switches which produce the switch signals being indicative of operation of the device will be referred to as the true state of the respective input switch. In terms of a specific planar ladder diagram, the controlled device is operated whenever a transverse electrical path is provided connecting the rails through the controlled device and through contacts which the associated switch signals indicate would be conductive.

The accumulator has a plurality of n individually programmable storage units respectively corresponding to the n rungs in the planar ladder diagram. The state of each storage unit is in part determined by whether the input switch corresponding to a contact represented in the corresponding rung is true; i.e., is indicative that the contact would be conductive and would therefore contribute towards operating the controlled device in the simulated diagram. This conditioning of the respective storage units will be referred to as "switch conditioning."

In the preferred embodiment all of the storage units are initially preset into a logic one state (indicating that all contacts in the ladder diagram would be conductive and that the controlled device should be operated), and switch conditioning clears the particular storage unit if the switch signals indicate that the associated contact would not be conductive.

After all input switches corresponding to the contacts in a column have been interrogated for switch conditioning, a process word is generated which causes the next in sequence column of the ladder diagram to be interrogated for switch conditioning on a rung-by-rung basis. Eventually all input switches corresponding to the contacts in the simulated ladder diagram are interrogated for switch conditioning.

The states of the storage units which correspond to the contacts which are interconnected in a particular column are also determined according to the then existing states of these units. In the preferred embodiment if at least one of these units has remained in the set state, thereby indicating that at least one contact in a group of interconnected contacts in a column would contribute towards operating the controlled device, all of the storage units corresponding to the group of interconnected contacts are set into the logic one state. This type of conditioning of the storage units will be referred to as "array conditioning."

The timing generator includes a system timing pulse generator which produces a set of periodic system timing pulses, a cycle of which defines a machine cycle. The system timing pulse generator causes one program word to be emitted from program storage during each machine cycle.

The timing generator also includes a process control pulse generator which is responsive to the program words and to the switch signals for producing switch conditioned and array conditioned processor control signals during various machine cycles. The switch conditioned processor control signals are produced in response to logic operations performed on the switch signals as dictated by the input words and determine the states of the respective storage units during switch conditioning.

The array conditioned processor control signals are generated in response to the process program words (which indicate which rungs in a particular column are interconnected). Immediately after completion of switch conditioning for each column, these signals are generated to determine the states of the storage units during array conditioning.

More specifically, after completion of the step of switch conditioning for a given column, the respective storage units are in a state representative of whether the corresponding rung in the associated column of the ladder diagram wound contribute to the path transverse between the rails for operating the controlled device. The process program word then indicates which of the rungs, if any, are commonly connected in the column by producing the array conditioned processor control signals. These signals set the states of all storage units corresponding to the contacts (if any) which the process program word indicates are connected commonly if, as had previously been indicated by the switch signals, at least one contact would be in the state contributing towards operating the controlled device. The array conditioned processor control signal also conditions the storage units corresponding to rungs which do not have contacts; they condition these units into a state indicating that they do not contribute towards the operation of the controlled device.

After the step of array conditioning, the next in-sequence column of the simulated array is interrogated for switch conditioning and array conditioning. After all columns in the simulated ladder diagram have been interrogated, the state of a predetermined one of the storage units contains the output signal and is determinative of whether the controlled device whose operation is characterized by the ladder diagram should be actuated.

According to another feature of the invention, the system interface is selectably operable for inputting data in either a synchronous mode or in an asynchronous mode. When operating in the synchronous mode, the switch signals are directly input to the controller without storage and are interrogated during the program scan cycle in which they are input. In the synchronous mode, a one scan cycle long buffer storage is provided for the switch signals. Accordingly, the signals are read from the buffer storage in the scan cycle subsequent to the scan cycle in which the switch signals were input into the storage. Synchronous operation is a valuable feature for controlled systems in which the change of state of a given switch during a scan cycle could render improper system operation.

According to this feature of the invention, the buffer storage includes a random access memory (RAM) having a plurality of addressable storage locations for selectively storing the switch signals, and control circuitry for effectively partitioning the RAM into at least two groups of storage locations. The control circuitry is coupled to a write enable input terminal of the RAM and to the highest order address input of the RAM. The control circuitry enables the highest order address input on alternate scan cycles so that the switch signals are written into higher order address locations during one scan cycle and into lower order address locations during the next in-sequence scan cycle. The control circuitry also enables the highest order address bit according to the whether data is being written into or read out of the RAM. Accordingly, during any given scan cycle, the control circuitry causes values of the switch signals to be written into one of the partitioned sections and to be read out of another partitioned section. During the next scan cycle, the switch signals are written into a different partitioned section and read out of a different partitioned section from the previous scan cycle, thereby allowing switch signals to be output during the scan cycle following their input.

As is apparent from the foregoing summary, it is a general object of the present invention to provide a novel and improved programmable controller for a controlled system.

Other objects and advantages and a more complete understanding of the invention may be obtained by referring to the following detailed description of a preferred embodiment when taken in conjunction with the accompanying drawings.

DETAILED DESCRIPTION OF A PREFERRED EMBODIMENT

A programmable controller 10 constructed and organized according to the invention is schematically shown in conjunction with a controlled system 12. The programmable controller 10 controls operation of the system 12 to operate according to a desired sequence of operation.

The controlled system 12 is only schematically illustrated as it may take the form of any of a variety of systems; for example, it may be a machine tool, an industrial process, or any of numerous systems whose operation is performed in a desired sequence. The system 12 has a plurality of normally open input switches $S_1$–$S_K$ and a plurality of controlled devices $D_1$–$D_L$. Each of the input switches S and the devices D is identified by an assigned address location and is connected for selective interrogation by the controller 10. The input switches S and the device D are not physically interconnected to one another in the system 12; the normally open input switches are individually and independently monitored by the controller 10 which, in turn, operates the device D.

The input switches S may take the form of limit switches, push-button switches, and relay contacts, or they may take the form of other devices, such as valves, whose operating status may be classified as on or off by a switch. The controlled devices D may take the form of any of a variety of relays, valves, motors, indicators, and the like depending on the nature of the system 12.

Operation of the system 12 is determined by the sequence of operation of the devices D. As is conventional in control systems, the devices D are respectively controlled according to the states selected ones of the input switches S. The method of characterizing operation of any of the controlled devices D in terms of the various input switches S is by the expedient of planar ladder diagrams.

Figures 2A, 2B, 2C:
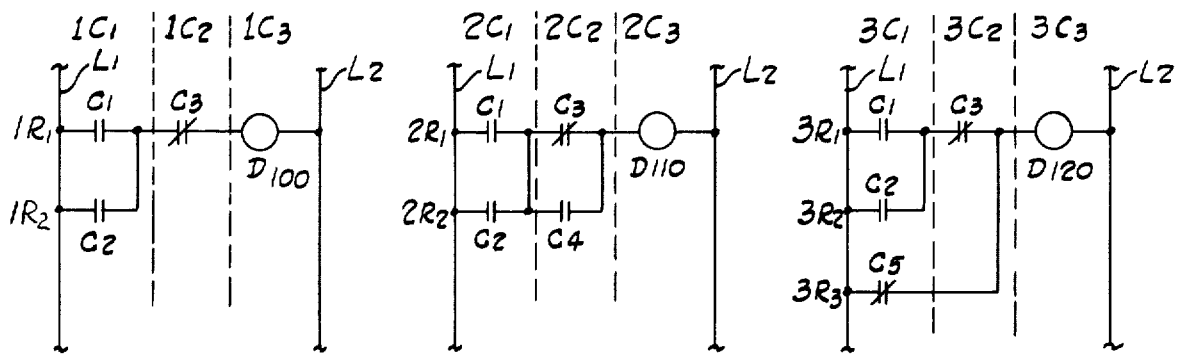
FIGS. 2a–2c are simplified ladder diagrams which characterize exemplary operation of the control system of FIG. 1.

Three simplified planar ladder diagrams for characterizing operation of representative controlled devices D100, D110, and D120 of the controlled system 12 are shown in FIGS. 2a–2c. A plurality of binary elements in the form of contacts are depicted in rungs R and columns C of the planar ladder diagrams of FIGS. 2a–2c as switch contacts either in a normally open or normally closed state. Each pair of contacts, regardless of its normal state, is associated with one of the input switches S.

A planar ladder diagram is here defined to include all conventional ladder diagrams not having overlapping connections between rungs or columns and having only lines, as opposed to contacts, interconnecting rungs. Accordingly, the controlled system 12 is further characterized as one whose operation is able to be characterized by a planar ladder diagram.

As a first example it is assumed that a device D100, such as a relay, is operated when, according to its ladder diagram, either or both of a pair of contacts $c_1$, $c_2$ (which may be limit switches) are in their closed state concurrently with a set of contacts $c_3$ (which may be a "run" button) being in its closed state. The ladder diagram of FIG. 2a characterizes this operation of the device D100 in terms of the normally open contacts $c_1$, $c_2$ and the normally closed contacts $c_3$. The contacts $c_1$, $c_3$ and the device D100 are serially connected in a first rung $1R_1$ between a pair of outer rails $L_1$, $L_2$. The contacts $c_1$, $c_3$, and the device D100 are respectively in columns $1C_1$, $1C_2$, and $1C_3$. The second contact $c_2$ is connected in a second rung $1R_2$ of the ladder diagram and is connected in parallel with the contact $c_1$ in the first column $1C_1$.

According to ladder diagram convention, the device connected in the ladder diagram is operated whenever an electrical path transversely connecting the rails $L_1$ $L_2$ is provided through the controlled device and the associated contacts.

FIG. 2b depicts a representative ladder diagram for operating a controlled device D110 when either or both of the contacts $c_1$, $c_2$ are in the closed state concurrently with the contact $c_3$ being in its closed state and/or a contact $c_4$ being in its closed state. The contacts $c_1$, $c_3$ are shown serially connected in first and second columns $2C_1$, $2C_2$ in a first rung $2R_1$ to the device D110. The contact $c_2$ is shown serially connected to the contact $c_4$ in a second rung $2R_2$. The contact $c_2$ is connected in parallel with the contact $c_1$ in the first column $2C_1$, and the contact $c_4$ is connected in parallel with the contact $c_3$ in the second column $2C_2$.

FIG. 2c depicts a ladder diagram for operating a controlled device D120 whenever either or both of the contacts $c_1$, $c_2$ are in their closed state concurrently with the contact $c_3$ being in its closed state. The device D120 is alternatively operated by a contact $c_5$ being in its closed state. The contacts $c_1$, $c_3$ are serially connected in a first rung $3R_1$. The contact $c_2$ is shown connected in a second rung $3R_2$ and in parallel with the contact $c_1$ in the first column $3C_1$. A normally closed contact $c_5$ is shown in a third rung $3R_3$ in the first column $3C_1$ and connected in parallel with the serially connected contacts $c_1$, $c_3$.

The illustrated ladder diagrams in FIGS. 2a–2c are shown with the rails $L_1$, $L_2$ broken. This is for mere convenience of illustration, as in practice the ladder diagrams are constructed in a column, representative of sequential operation of the devices D100, D110, D120 as the rungs in the column are sequentially traversed.

The three ladder diagrams of FIGS. 2a–2c exemplify basic configuration illustrative of operation of the controller 10. The diagram of FIG. 2a is representative of the simple configuration wherein a single contact ($c_3$) is connected to the controlled device (D100); FIG. 2b represents a diagram wherein a plurality of contacts ($c_3$, $c_4$) are directly connected to the controlled devices (D110); and FIG. 2c represents, in addition to a plurality of contacts ($c_3$, $c_5$) connected to the controlled device (D120), a "space" or absence of a contact (in rung $3R_2$, column $3C_2$) and a "line" such as a wire replacing a contact (in rung $3R_3$, column $3C_2$).

Referring again to FIG. 1, the programmable controller 10 includes program storage 20, a processing unit 22, and a system interface 24 which operate to control the system 12 according to ladder diagrams such as illustrated in FIGS. 2a–2c. The operator of the controller 10 directly programs into the program storage 20 a set of program words which are directly representative of the ladder diagrams characterizing desired operation of the system 12. The system interface 24 is coupled to the normally open input switches S corresponding to the contacts in the ladder diagrams and to the devices D for inputting switch signals, IPO, indicative of status conditions of the input switches S and for transmitting output signals, OPO, for operating the devices D. The processing unit 22 operates on the switch signals under control of the sequence of program words simulating the ladder diagram and generates the output signal OPO through the system interface 24.

THE PROGRAM STORAGE 20

The program storage 20 includes a program memory circuit 26 for storing the sequence of program words which represent the ladder diagrams characterizing desired operation of the system 12, and a program address generator 28 for providing a sequence of memory address signals, MA, to the program memory circuit 26. The sequence of address signals, MA, operates the program memory circuit 26 to output the program words in a sequential order which directly characterizes the ladder diagrams on a rung-by-rung and column-by-column basis. Each program word is output from the memory circuit 26 during a period defined as a machine cycle, so that several machine cycles are required to simulate one ladder diagram. One or more of the sequences of program words for characterizing all ladder diagrams in a desired operating sequence of the system 12 comprise a period defined as a scan cycle.

Figure 3:
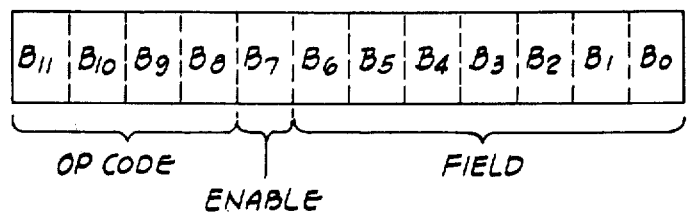
FIG. 3 is a schematic illustration of a program word used in the controller of FIG. 1.

The format of such program words stored in the memory circuit 26 is shown in FIG. 3. The word is comprised of a plurality of bits B, which in the preferred embodiment is a plurality of 12 bits $B_0$–$B_{11}$. The bits $B_0$–$B_6$ in combination provide an address field; bit $B_7$ is dedicated as an enable bit used as a switch command; and bits $B_8$–$B_{11}$ are used as an operations code (OP code) field.

In order to fully characterize the various types of planar ladder diagrams, the program memory circuit 26 stores program words of three basic kinds: input words, output words, and process words.

Input words (1) define the type of elements which may be represented in one rung of one column of the respective ladder diagrams and (2) define the "true" state of each switch S which corresponds to a given set of contacts in the ladder diagram. The true state of the switch is defined as that state which produces the associated switch signal which is indicative that the corresponding contacts are able to contribute towards operating the particular controlled device. There are four types of input words: NORMALLY OPEN (NO), NORMALLY CLOSED (NC), LINE, and SPACE.

A NO input word represents a normally open contact which defines the corresponding switch S to produce a true switch signal when the switch S is in its closed, i.e., conductive, state for purposes of that machine cycle. A NC input word represents a normally closed contact which defines the corresponding switch S to produce a true switch signal when the switch S is in its open, i.e., nonconductive, state for purposes of that machine cycle. As this implies, a particular switch S may be characterized as normally open during one machine cycle and as normally closed during another.

Referring to the format of FIG. 3, the input words also identify the address or location of the respective switch for the cases of NC and NO input words. This address is specified in the field comprising bits $B_0$–$B_6$ 1-R and the type of the switch S, or LINE or SPACE is defined by the OP code field comprising bits $B_8$–$B_{11}$.

A LINE input word represents the absence of contacts and the presence of a wire in the respective rung connecting adjacent columns (i.e., an automatic true). A SPACE input word represents the absence of contacts and is an open circuit in a respective rung between adjacent columns (i.e., an automatic false).

There are two types of process program words: TIE and ENDPRG. A TIE program word represents the colmnar connection, if any, between rungs in a respective column. The bits $B_0$–$B_6$ are used to indicate which rungs are connected. For example, in the ladder diagram of FIG. 2c, a TIE 1 program word would be produced to specifically indicate that rungs $3R_1$, $3R_2$ are commonly connected in the first column, and a TIE 3 program word would be produced to specifically indicate that the rungs $3R_1$, $3R_2$, $3R_3$ are commonly connected in the second column. Treatment of the open in the second rung will become clear subsequently upon a more detailed description of the processing unit 22.

An ENDPRG program word represents the end of the sequence of program words in a scan cycle and is the last word stored in the program memory circuit 26.

The illustrated embodiment has only one output program word (referred to as a COIL program word), and it represents the interconnection of a controlled device D in the respective ladder diagram. The bits $B_0$–$B_6$ define the address location of the device 16 in the controlled system. For example, a COIL 120 program word in FIG. 2c following the TIE 3 program word which indicated that rungs $3R_1$, $3R_3$ were tied together would indicate that the controlled device 120 is connected to the common connection of the rungs $3R_1$, $3R_3$.

Table I shows Examples I-VII illustrating each of the types of program words.

TABLE I.

| EXAMPLE | TYPE | $B_{11}$ | $B_{10}$ | $B_9$ | $B_8$ | $B_7$ | $B_6$ | $B_5$ | $B_4$ | $B_3$ | $B_2$ | $B_1$ | $B_0$ |
|---------|---------|---|---|---|---|---|---|---|---|---|---|---|---|
| I | NO7 | 0 | 1 | 0 | 1 | X | 0 | 0 | 0 | 0 | 1 | 1 | 1 |
| II | NC16 | 0 | 1 | 0 | 0 | X | 0 | 0 | 1 | 0 | 0 | 0 | 0 |
| III | LINE | 0 | 0 | 1 | 0 | X | X | X | X | X | X | X | X |
| IV | SPACE | 0 | 0 | 1 | 1 | X | X | X | X | X | X | X | X |
| V | TIE 1 | 0 | 1 | 1 | 0 | X | 0 | 0 | 0 | 0 | 0 | 0 | 1 |
| VI | COIL 100 | 0 | 1 | 1 | 1 | X | 1 | 1 | 0 | 0 | 1 | 0 | 0 |
| VII | ENDPRG | 0 | 0 | 0 | 1 | X | X | X | X | X | X | X | X |

Example 1 depicts the input word taking the form of a NO 7 which indicates that the contacts corresponding to the input switch at location 7 in the controlled system 12 is normally open (which defines the input switch at location 7 as producing a true switch signal when the switch is closed). A binary 5 in bits $B_8-B_{11}$ identifies the type of contacts to be normally open, and the bits $B_0-B_6$ identify the address location in binary.

Example II depicts the NC input word (as identified by a binary 4 in the bits $B_8-B_{11}$) indicating that the contacts corresponding to the input switch at address location 16 (as identified by a binary 16 is the bits $B_0-B_6$) is normally closed (which defines the input switch at location 16 as producing a true switch signal when the switch is open).

Example III shows the LINE input word identified by a binary 2 in the bits $B_8-B_{11}$ and representing that a wire is connected in place of contacts in the respective rung of the ladder diagram. Because no input switch is addressed with a LINE program word, the field $B_0-B_6$ need not be programmed.

Example IV shows the SPACE input word designated by a binary 3 in the bits $B_8-B_{11}$. The field of bits $B_0-B_6$ need not be programmed since no input switch S is referenced.

Example V shows the TIE program word which has the bits $B_0-B_6$ identifying the specific rungs which are interconnected in the respective column. The TIE program word is identified by a binary 6 in the bits $B_8-B_{11}$, and the interconnection of the first and second rungs is identified by a binary 1 in the bits $B_0-B_6$.

Example VI illustrates the COIL output program word characterizing that the controlled device D in location 100 is connected in the respective ladder diagram and is to be controlled by the controller 10. A COIL program word is identified by a binary 7 in the bit $B_8-B_{11}$, and the location 100 is represented in binary in the field of bits $B_0-B_6$.

Example VII represents the ENDPRG program word which is characterized by a binary 1 in the bits $B_8-B_{11}$. The field of bits $B_0-B_6$ is not programmed.

THE PROGRAM ADDRESS GENERATOR 28

The address generator 28 generates an eleven bit memory address MA0-MA10 on sets of lines 40, 46 for addressing storage locations in the program memory circuit 26. The generator 28 is a programmable counter or an interconnection of several programmable counters having outputs which in combination provide eleven bits. A series interconnection of three, four bit programmable counters sold by RCA Corporation under the numerical designation CD 4029 is suitable. The highest order bit of the last in series counter is unused. The first counter in the series is pulsed sequentially so that the eleven bits are sequentially incremented in binary.

Figure 4:
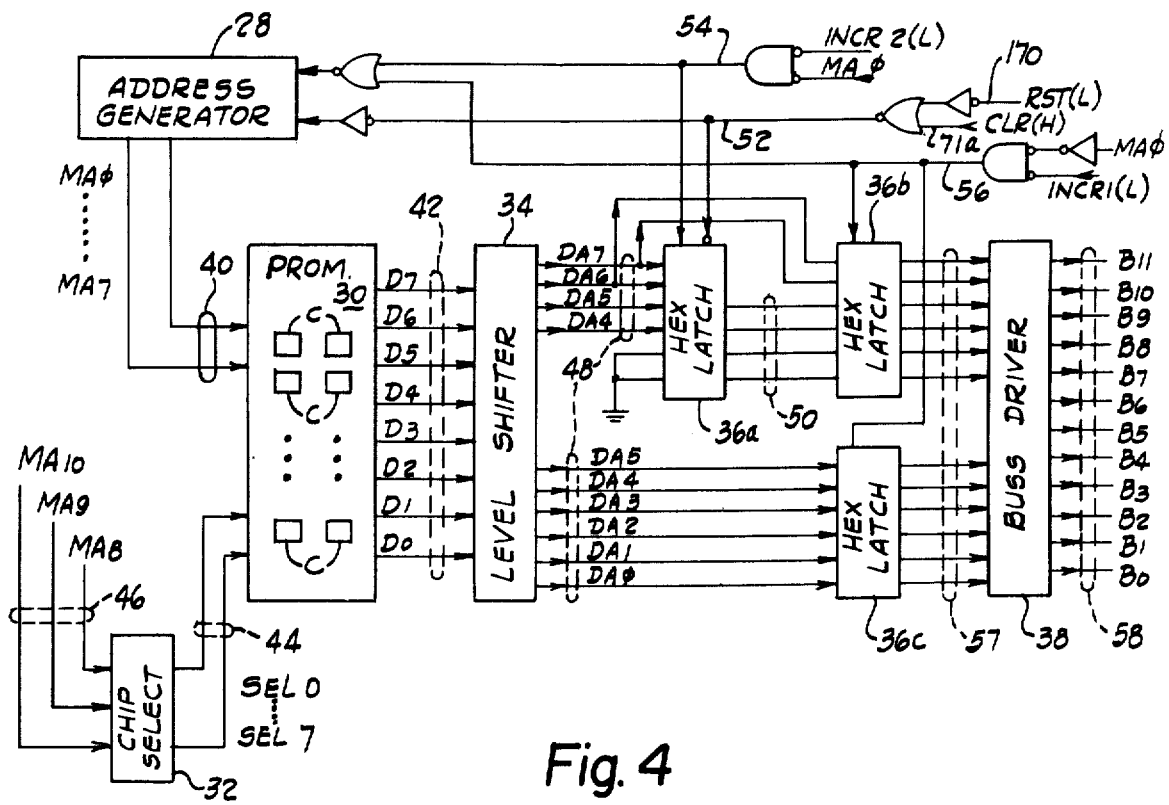
FIG. 4 is a functional representation of a program storage circuit used in the controller of FIG. 1.

As seen in FIG. 4, the address register 28 is responsive to a clear signal (hereafter the CLR signal) and to a reset signal (hereafter the RST signal) via a line 52 for setting the address register and setting the memory address bits MA0-MO10 to a logic 1. The address generator 28 is also responsive to a first increment signal (hereafter the INCR 1 signal) via a line 56 whenever the first memory address bit MA0 is a logic 1 and is also responsive to another increment signal (hereafter the INCR 2 signal) via a line 54 whenever the first memory address bit MA0 is a logic 0. After the address generator 28 is initially set to a 11111111111 state by either the CLR or the RST signals, the INCR 1 signal increments the address generator 28 to provide a memory address location of 00000000000.

The subsequent occurrence of the INCR 2 signal after the MA0 bit has been set into a logic 0 state increments the address register 28 to produce a 00000000001 memory address. This process continues until all program words in the program memory circuit 26 have been read out in sequence.

THE PROGRAM MEMORY CIRCUIT 26

The program memory circuit 26 is schematically shown in FIG. 4 and comprises a program word storage unit in the form of a programmable read only memory (hereafter PROM) 30 having a plurality of programmable memory chips c, a chip select circuit 32, a voltage level shifter circuit 34 coupled to the output of the programmable memory 30, a plurality of three hex latch circuits 36 coupled to the outputs of the level shifter circuit 34, and a buss driver circuit 38 coupled to the outputs of the latch circuits 36.

The PROM 30 in the illustrated embodiment is comprised of a plurality of six memory chips c responsive to the memory address bits MA0–MA10 for producing a first set of program word signals D4–D7 and a second set of program word signals D0–D7 on successive machine cycles. Each memory chip c is a 2,048 bit, programmable read only memory and is commercially available from Intel Corporation under the numeric designation 1702a. Each of the memory chips may be addressed to provide up to 128 sixteen bit words. In the illustrated and preferred embodiment, each program word includes 12 bits, and each chip c is addressed to store and provide up to 128 twelve bit program words as defined by the signals D4–D7, D0–D7.

The six chips c are interconnected in a conventional fashion to provide storage for up to 768 program words in one scan cycle. Greater or lesser numbers of the chips c could be interconnected to provide storage commensurate with the number of program words needed for the particular application.

Each of the six chips c has a select terminal, a plurality of eight memory address terminals, and a plurality of eight data output terminals. Like memory address terminals of each chip are commonly connected and are responsive to the memory address bits MA0–MA7 on the lines 40 for the selection of particular memory locations in the respective chips c. Like output terminals of the chips c are respectively connected to a set of data output lines 42 for outputting the contents of the addressed bits to the level shifter 34. The select terminals of the respective chips c are individually connected to the chip select circuit 32 by a set of lines 44.

The chip select circuit 32 is responsive to the memory address bits MA8–MA10 on the lines 46 from the program address generator 28 for producing a set of select signals SEL0–SEL7 on the lines 44. The select signals SEL0–SEL7 are produced according to the logic encoding of the memory address bits MA8–MA10 on the lines 46 for selecting and enabling only one of the six chips c.

The chip select circuit 32 is a 4:10 decoder having its highest order input bit coupled to circuit ground. The decoder is commercially available from RCA Corporation under the numerical designation CD4028.

The level shifter circuit 34 produces on a set of lines 48, a set of shifted signals DA0–DA7 whih are logic equivalents of the signals D0–D7. The voltage levels of the memory chips are bipolar integrated circuit levels, and the shifter circuit 34 converts the bipolar levels to CMOS integrated circuit levels. Specifically, the typical five-volt levels produced by the PROM 30 are converted to typical 14-volt CMOS levels.

Figure 11:
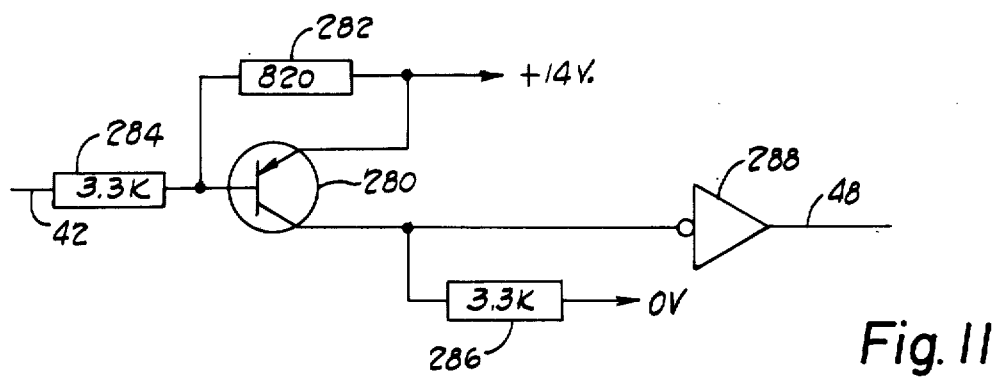

The level shifter circuit 34 is comprised of a plurality of individual shifter circuits, one for each of the lines 42. A preferred individual circuit is shown in FIG. 11 and includes a PNP transistor 280. The transistor 280 has its emitter terminal connected to a 14-volt supply and has its base connected to the supply via a bias resistor 282. A base resistor 284 is provided for coupling the base terminal of the transistor 280 to the respective one of the lines 42. The collector of the transistor 280 is coupled through a load resistor 286 to circuit ground and is coupled to a buffer amplifier 288 for producing the shifted signals on the respective one of the lines 48.

In operation, the voltage values of the signals D0–D7 vary between 9 and 14 volts. This swing respectively renders the transistor 280 conductive and nonconductive, producing an approximate 13.8 volts swing across the load resistor 286.

The hex latch circuits 36a–36c are conventional and have six input lines and six output lines respectively. The latch circuit 36a has four of its inputs connected by the lines 48 to the level shifter 34 for receiving the bits DA4–DA7 corresponding to the $B_7$–$B_{10}$ bits of the twelve bit program word. The other two inputs of the latch circuit 36a are connected to circuit ground, and the corresponding two outputs are unused.

The latch circuit 36b has four of its inputs connected to the outputs of the latch circuit 36a via a set of lines 50. The other two inputs of the second latch are connected to receive the DA7, DA6 signals on the lines 48 from the level shifter 34. The latch circuit 36c has all of its inputs connected to the level shifter 34 for receiving the data bits DA0–DA5 on the lines 48.

Each of the latch circuits 36a–36c also has a strobe input terminal and a clear input terminal. The clear input terminal on the latch circuits 36b, 36c are disabled and are not shown in FIG. 4. The clear terminal of the circuit 36a latch is coupled by the line 52 for receiving a logic NOR combination of the clear signal CLR and the reset signal RST for periodically clearing the latch circuit 36a. The strobe input of the latch circuit 36a is connected by the line 54 to a logic AND combination of the increment signal INCR 2 and the zero bit of the memory address signal, MA0. Upon the INCR 2 and the MA0 signals concurrently residing in a logic 0 state, a strobe and increment signal is generated for strobing the signals DA4–DA7 into the latch circuit 36a and for latching the logic values of these signals on the lines 50.

The latch circuits 36b, 36c have their strobe input terminals connected via the line 56 to a logic AND connection of the increment signal INCR 1 and the inverted 0 bit of the memory address signal, MA0. Upon the INCR 1 signal residing in a logic 0 state concurrently with a logic 1 state of the zero bit of the memory address signal, another strobe and increment signal is generated and coupled via the line 56 for strobing the signals DA0–DA5, DA6–DA7 on the lines 48 and the contents of the latch circuit 36a via the lines 50 into the circuits 36c, 36b, respectively.

The buss driver 38 is comprised of a set of 12 conventional line driver circuits. Each line driver circuit is connected via a set of lines 57 to a respective output of the hex circuits 36b, 36c. The twelve bits of the signals DA are transmitted by the buss driver 38 via a set of lines 58 as the twelve bit program word bits B0–B11.

In operation, the address generator 28 is sequentially incremented by the strobe and increment signals on the lines 54, 56 for producing a sequence of the memory address signals MA0–MA10. Bits MA8–MA10 of the memory address are coupled by the lines 46 to the chip select 32 for selecting one of the chips c. The bits MA0–MA7 of the memory address are coupled on the lines 40 to the PROM 30 for selecting one of the locations in the selected one of the chips c.

The signals D0–D7 from the selected locations are output from the PROM 30 through the level shifter 34 and into the latch circuits 36a–36c. In order to provide a 12 bit program word from the sequence of 8 bit storage locations in the PROM 30, the storage locations in the PROM 30 are respectively grouped into sequential pairs. The first storage location of each pair contains a 4 bit program word and the next storage location contains an 8 bit storage word. The address generator 28 is incremented twice by the INCR 1 and INCR 2 signals or enabling the PROM 30 to provide the complete 12 bit program word. The first increment of the address register 28 causes the output of the signals D4–D7 from the first of each sequential pair of storage locations in the PROM 30 into the latch circuit 36a. Upon the next increment of the address register 28, the D0–D7 bits of the second in-sequence storage location of each pair of locations in the PROM 30 are output into the latch circuits 36b, 36c. Concurrently, the bits DA4–DA7 previously stored in the latch circuit 36a are input into the latch circuit 36b. Accordingly, after the second increment of the address register, twelve bits from the PROM 30 are stored in the latch circuits 36b, 36c as the bits $B_0$–$B_{11}$ of the program word. This sequence begins on the last word in the scan cycle so that the number of machine cycles needed to produce the entire sequence of double byte extracted program words is minimized.

Figure 1:
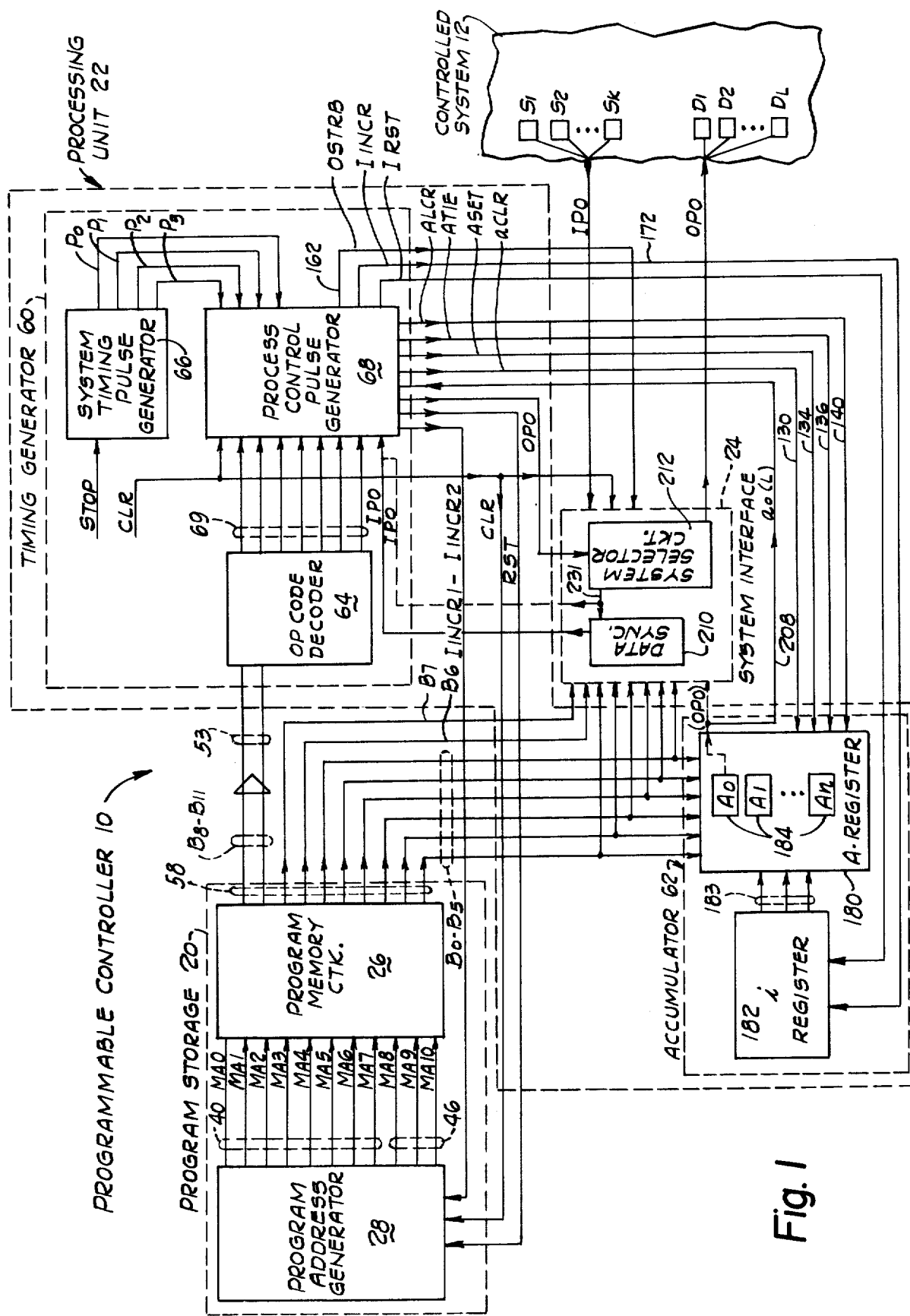
FIG. 1 is a schematic drawing showing a programmable controller operating a controlled system.

Referring to FIG. 1, the processing unit 22 comprises a timing generator 60 and an accumulator 62. The timing generator 60 is responsive to the B8-B11 bits of the program words from the program storage 20 and to the IPO switch signals from the system interface 24 for producing pluralities of processor control signals which control operation of the accumulator 62. The accumulator 62 is responsive to the B0-B5 bits of the respective program words from the program storage 20 and to the plurality of the processor control signals for producing and transmitting to the system interface 24 an $a_0(L)$ output signal. The IPO switch signals are representative of the state in which the switches S of the controlled system 12 reside, and the $a_0$ output signal is indicative of whether the selected controlled device D of the controlled system 12 should be operated, as determined by the ladder diagram representation stored in the PROM 30 and the IPO switch signals.

The timing generator 60 includes an operation code (OP CODE) decoder 64, a system timing pulse generator 66, and a process control pulse generator 68. The OP CODE decoder 64 is responsive to the $B_8-B_{11}$ bits of the respective program word on the lines 58 for producing a set of decoded signals on a set of output lines 69 to the process control pulse generator 68. The system timing pulse generator 66 is a free running generator which generates to the process control pulse generator 68 a set of system timing pulses (hereafter the pulses $P_0, P_1, P_2, P_3$) which are sequential and periodic. The period of the timing pulses constitute the period of one machine cycle during which the accumulator 62 is conditioned according to a specific rung in a specific column in the simulated ladder diagram stored in the program storage 20.

Figure 5:
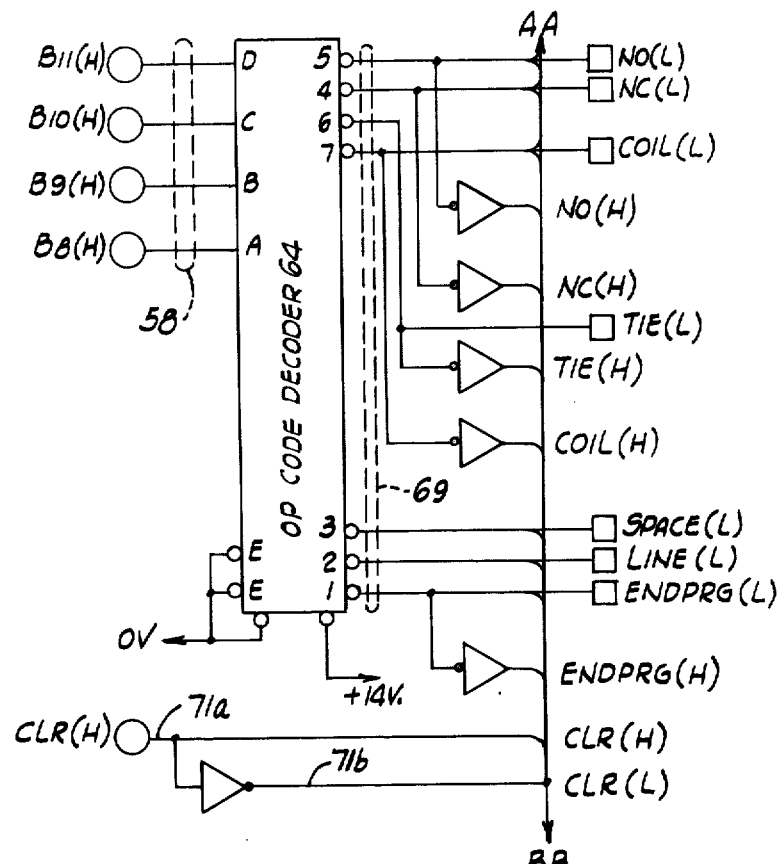
FIG. 5 is a circuit schematic illustrating an operations code decoder utilized in the controller of FIG. 1.

Referring to FIG. 5, the OP CODE decoder 64 is a conventional 4:16 decoder commercially available from National Semiconductor Corporation under the numeric designation 74C154. The OP CODE decoder 64 decodes the $B_8-B_{11}$ bits of each program word to generate on the lines 69 a set of decoder signals representing a set of operating instructions. The operating instructions include a normally open signal (hereafter NO(L) signal) and its complement NO(H) corresponding to a normally open input word, a coil signal (hereafter COIL(L) signal) and its complement COIL(H) corresponding to the output word, a tie signal (hereafter TIE(L) signal) and its complement TIE(H) corresponding to the TIE process word, a space signal (hereafter SPACE signal) which corresponds to the SPACE input word, a line signal (hereafter LINE signal) corresponding to the LINE input word, and an end program signal (hereafter ENDPRG(L) signal) and its complement ENDPRG(H) corresponding to the ENDPRG process word. The illustrated program word has four bits in the OP CODE field so that up to sixteen decoder signals could be generated if desired.

The clear CLR(H) signal and its complement CLR(L) are also shown in FIG. 5. The true and complemental CLR signals are produced respectively on a set of lines 71a, 71b during powering up of the controller 10 and produced by power supplies in a conventional manner.

Figure 7:
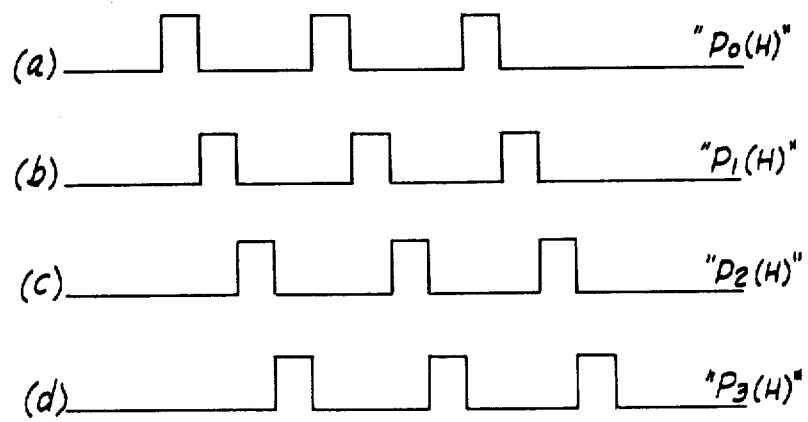
FIGS. 7a–7d are representative pulse waveforms generated by the system timing pulse generator of FIG. 6.
Figure 6:
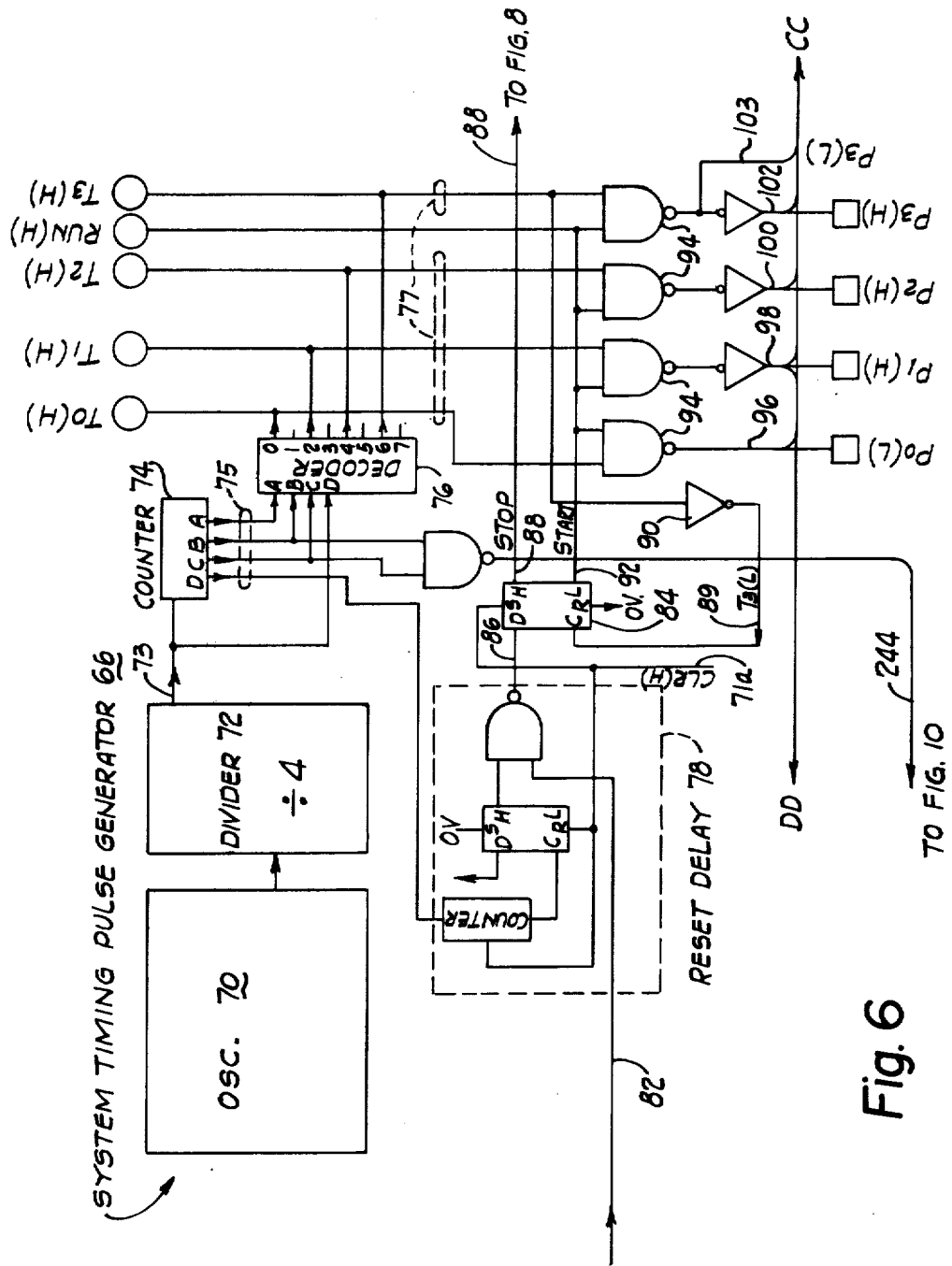
FIG. 6 is a circuit schematic illustrating a system timing pulse generator utilized in the controller of FIG. 1.

The system timing pulse generator 66 is shown in detal in FIG. 6, and exemplary waveforms of the system timing pulses $P_0-P_3$ are shown in FIG. 7. The system timing pulse generator 66 includes an oscillator 70 of any conventional type which in the illustrated embodiment is a free running crystal oscillator operating at a four megahertz frequency. A divider circuit 72 is connected to the output of the oscillator 70 for suitably dividing down the frequency. In the illustrated embodiment, the divider circuit 72 is a divide-by-4 stage comprised of a pair of serially connected flip-flops for providing a 1MHz signal.

The one-megahertz signal is output on a line 73 from the divider 72 and is input to a counter 74 and to a decoder 76. Output signals on a set of lines 75 from the counter 74 are also input to the decoder 76 and to a reset delay circuit 78. In response to the one-megahertz signal from the divider 72 and to the output signals from the counter 74, the decoder 76 generates on a set of lines 77 a set of timing pulses $T_0(H)-T_3(H)$ having a repetition rate of 8 microseconds and which are utilized in generating the system timing pulses $P_0-P_3$. By connecting the output signals on the lines 75 from the counter 74 into the lower order inputs of the decoder 76, the leading edges of the timing signals $T_0-T_3$ are displaced in time from one another. By connecting the one-megahertz signal on the line 73 from the divider 72 into the highest order input of the decoder 76, the timing signals $T_0-T_3$ have a pulse width less than two microseconds so that there is no overlap between any of the pulses $T_0-T_3$ or $P_0-P_3$.

The reset delay circuit 78 is responsive to the CLR(H) signal on the line 71a to produce a reset delay signal on a line 86 approximately 0.1 seconds after generation of the CLR(H) signal on the line 71a. The 0.1 second delay provides time for voltage stabilization of the components in the controller. The reset delay circuit 78 is also responsive to a STOP signal on a line 82 for allowing external system apparatus, such as a computer, to delay generation of the reset delay signal.

The reset delay signal is coupled to a START flip-flop 84 by the line 86. A set terminal of the START flip-flop 84 is responsive to the CLR signal on the line 71a for setting the state of the flip-flop 84 to produce a stop signal at its true output on a line 88. Approximately 0.1 seconds later, the reset delay signal on the line 86 is clocked into the START flip-flop 84 by the occurrence of a $T_3(L)$ timing pulse on a clock line 89. The line 89 is coupled by an inverter 90 to the lines 77 for receiving the $T_3(H)$ signal. The reset delay signal resets the flip-flop 84 to remove the stop signal from the line 88 and produce a start pulse at its other output on a start line 92.

A set of logic gates 94 are coupled to the start line 92 and to the lines 77 from the output of the decoder 76 for respectively receiving the start signal and the timing pulses $T_0-T_3$. The occurrence of the timing pulses $T_0-I_3$ anytime after approximately 0.1 seconds following a CLR signal causes the logic gates 94 to generate the system timing pulses $P_0-P_3$. The pulses $P_0-P_3$ are generated as $P_0(L), P_1(H), P_2(H), P_3(H)$ and $P_3(L)$, respectively, on a set of lines 96, 98, 100, 102, 103 for transmission to the process control pulse generator 68.

Figure 8:
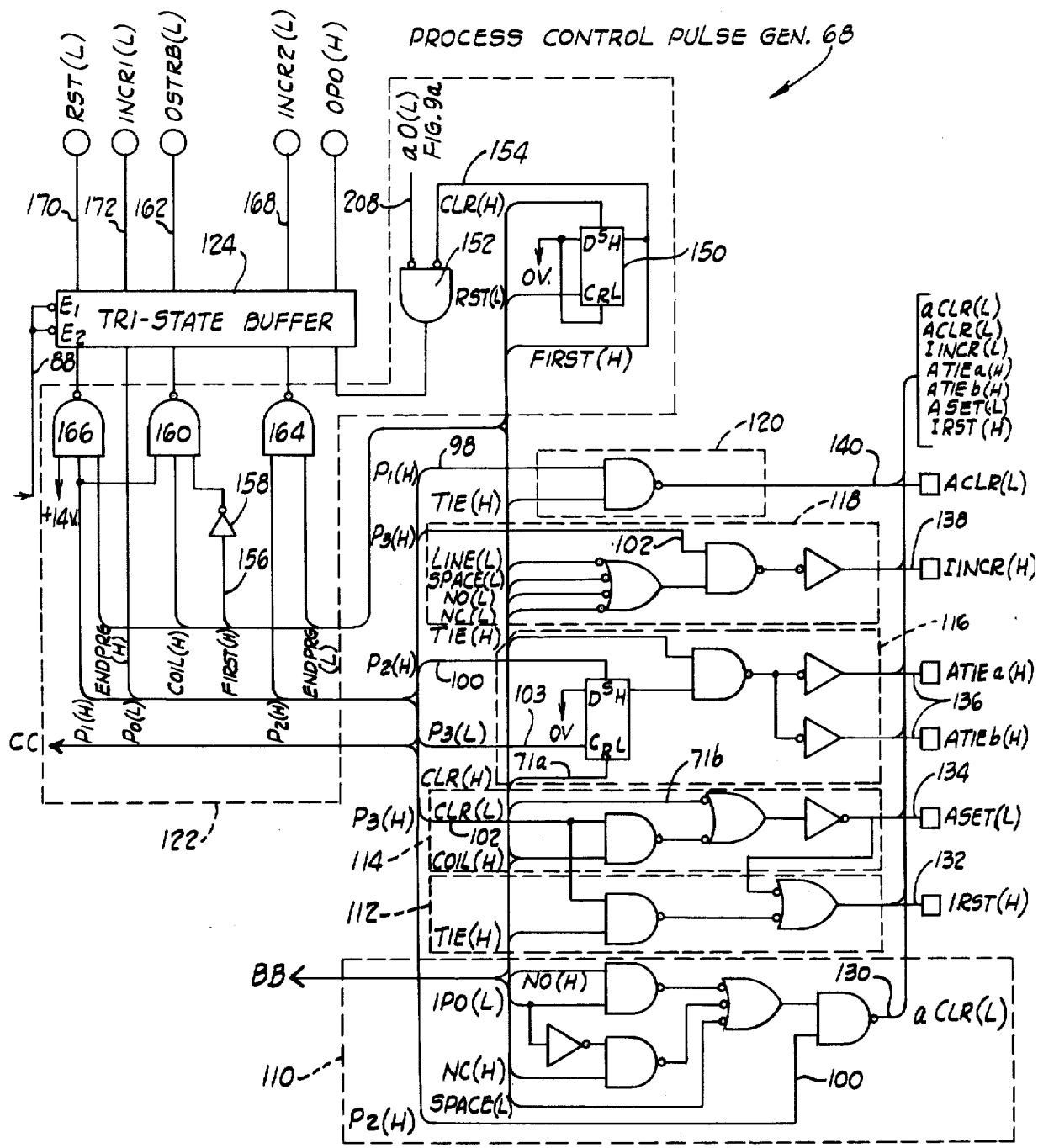
FIG. 8 is a circuit schematic of a process control pulse generator utilized in the controller of FIG. 1.

The process control pulse generator 68 for producing the processor control signals is shown in FIG. 8. The pulse generator 68 comprises a first set of logic circuits 110, 112, 114, 116, 118, 120 for producing switch conditioned and array conditioned processor control signals which condition the accumulator 62. The generator 68 further includes a second set of control logic circuits 122 and a tristate output buffer gate 124 for providing the RST signal, the INCR 1 signal, an output strobe signal (hereafter (OSTRB), the INCR 2 signal, and the output signal OPO.

The logic circuit 110 is responsive to the $P_2(H)$ timing pulse, to the SPACE signal, to the NC(H) signal, to the IPO switch signals and to the NP(H) signal for producing a storage unit clear signal (hereafter the aCLR signal) on a line 130. The logic circuit 110 produces the aCLR signal according to the logic equation:

$$[IPO(L)^{IPO(L)} \cdot NO(H++ \quad IPO(N) \cdot NC(H)+ \quad SPACE(H)] \cdot p_2(H) = aCLR(L) \text{ EQUATION 1.}$$

One state of the aCLR signal is representative of a particular rung in the simulated ladder diagram being able to contribute towards operating the particular control device D associated with that ladder diagram. The other state of the aCLR signal represents that that particular rung cannot contribute toward operating the specific controlled device D.

The logic circuit 112 produces the $i$ reset signal (hereafter IRST signal) on a line 132 which is also utilized for conditioning the accumulator 62. The circuit 112 is responsive to the TIE(H) signal, to the $P_3(H)$ timing pulse, to the COIL(H) output signal and to the CLR(L) signal for producing the IRST signal according to the logic equation:

$$p_3(H) \cdot [COIL(H) + TIE(H) + CLR(H)] = IRST(H) \text{ EQUATION 2.}$$

The IRST signal is representative that all rungs in a particular column of the ladder diagram which may contribute toward operating the controlled device have conditioned the accumulator and that any remaining rungs do not have any contacts. This occurs upon the occurrence of the COIL or TIE program words or upon a reset RST signal occurrence.

The logic circuit 114 is responsive to the $P_3(H)$ timing pulse, to the COIL(H) signal and to the CLR(L) signal for producing a preset accumulator signal (hereafter referred to as the ASET signal) on a line 134. The logic circuit 114 generates the ASET signal according to the logic equation:

$$\overline{p_3(H) \cdot COIL(H)} + CLR(H) = ASET(L) \text{ EQUATION 3.}$$

The ASET signal is generated at the end of the processing of each ladder diagram for conditioning the accumulator 62 in preparation for the next in-sequence ladder diagram.

The logic circuit 116 is responsive to the $P_3(L)$ system timing pulse, to the CLR(H) signal, to the $P_2(H)$ timing pulse and to the TIE(H) signals for generating an ATIE signal on a line 136 which conditions the accumulator 62 according to which rungs in the ladder diagram are commonly connected in a particular column. The ATIE signal is generated on the set of lines 136 whenever a TIE signal is generated after the occurrence of the leading edge of the $P_2(H)$ system timing pulse and prior to the occurrence of the $P_3(L)$ timing pulse. During this time period, the aCLR(L) signals have completed conditioning the accumulator 62, and the accumulator 62 is prepared for conditioning by the ATIE signals.

The logic circuit 118 is responsive to the LINE(L), SPACE(L), NO(L) and NC(L) signals and to the $P_3(H)$ system timing pulse to generate an increment accumulator signal (hereafter the IINCR signal) on a line 138. The IINCR signal is generated according to the logic equation:

$$[LINE(H) + SPACE(H) + NO(H) + NC(H)] \cdot P_3(H) = IING(H) \text{ EQUATION 4.}$$

The IINCR signal corresponds to the sequential shifting from one rung to the next rung in the respective ladder diagram stored in the program storage 20 during conditioning of the accumulator 62 by the aCLR signals.

The logic circuit 120 is responsive to the TIE(H) signal and to the $P_1(H)$ system timing pulse to generate an accumulator clear signal (hereafter the ACLR signal) on a line 140 for selectively clearing the accumulator 62. The logic circuit 120, comprises a logic NAND gate which provides the ACLR signal according to the logic equation:

$$\overline{TIE(H) \cdot P_1(H)} = ACLR(L) \text{ EQUATION 5.}$$

The ACLR signal is representative that no other rungs in the particular column of the respective ladder diagram can contribute towards operating the particular controlled devices D.

The effect of the processor control signals on the accumulator 62 will be described in more detail in conjunction with the description of the accumulator 62.

The logic circuit 122 includes a D-type flip-flop 150 responsive to the CLR(H) signal and to the RST(L) signal for generating a FIRST (H) signal which is in a logic 1 state only during the fist scan cycle following initial powering up of the controller 10.

The FIRST(H) signal is input to a logic gate 152 for enabling the $a_0(L)$ output signal from the accumulator 62 to be output through the tristate gate 124 as the output signal OPO during all except the first scan cycle. The FIRST(H) signal is also input on a line 156 through an inverter 158 to a logic gate 160. The logic gate 160 is responsive to the COIL(H) signal and to the $P_1(H)$ system timing pulse for generating the output strobe signal OSTRB on a line 162 through the gate 124. The OSTRB signal is coupled to the system interface 24 for strobing the output signal OPO to the controlled system 12.

The logic circuit 122 has a gate 164 and a gate 166 for respectively producing the INCR 2 signal and the RST signal. The gate 166 is responsive to the ENDPRG(H) signal and to the $P_1(H)$ timing pulse to produce the RST(L) signal on a line 170 through the gate 124 during the $P_1$ pulse of the last or ENDPRG machine cycle, corresponding to the end of a scan cycle.

The gate 164 is responsive to the ENDPRG(L) signal and to the $P_2(H)$ timing pulse for producing the INCR 2 signal on a line 168 through the gate 124 during each $P_2$ timing pulse except one occurring during the machine cycle corresponding to the ENDPRG program word. The INCR 2 signal is not produced during the ENDPRG machine cycle to account for the resetting of the address generator 28 via the RST(L) signal during the ENDPRG machine cycle.

The tristate gate 124 has three output states; a logic one, a logic zero, and a high impedance state. The high impedance state selectively allows interfacing with a computer so that the computer can, for example, read from memory, generate OPO output signals, and retrieve IPO switch signals.

The $P_0(L)$ timing pulse produces the INCR 1 signal on a line 172 through the tristate gate 124 during each machine cycle except when the STOP signal has been generated on the line 88, such as during initial power up of the controller. It transmits the RST, INCR 1, OSTRB, INCR 2, and OPO signals during all machine cycles followinng the 0.1 second delay after initial clearing of the controller 12.

To assist in understanding the operation of the controller in conjunction with the signals generated by the timing generator 60, Table II is set forth listing the signals (in their order of occurrence) and their primary functions.

TABLE II

| SIGNAL | FUNCTION OR REPRESENTATION |
|---|---|
| RST | RESETS the address register 28. |
| INCR1 | INCREMENTS the address register 28. |
| INCR2 | INCREMENTS the address register 28. |
| NO | Represents NORMALLY OPEN contact in ladder diagram. |
| NC | Represents NORMALLY CLOSED contact in ladder diagram. |
| COIL | Represents the controlled device in the ladder diagram. |
| TIE | Represents the completion of switch conditioning for one column of ladder diagram and indicates which rungs in column are interconnected. |
| SPACE | Represents lack of contacts in a rung in a column of ladder diagram. |
| LINE | Represents a short circuit in a rung in a column of ladder diagram. |
| ENDPRG | END OF PROGRAM - represents end of scan cycle. |
| aCLR | CLEAR a selected storage unit in Accumulator 62 if switch signal indicates associated input switch S is not true (if associated rung in ladder diagram cannot contribute towards operating the controlled device). |
| IRST | Represents that all rungs having contacts in one column of the ladder diagram have conditioned the associated storage units in the Accumulator 62 and that the first rung in the next column is to be considered next. |
| ASET | Initially sets all storage units in the Accumulator 62. |
| IINCR | Indicates when the next in the column rung in the ladder diagram is being considered for conditioning the Accumulator 62. |
| ACLR | CLEARS all remaining storage units in the Accumulator 62 when "TIE" signal indicates that all rungs having contacts in the ladder diagram have been considered. |
| OSTRB | OUTPUT STROBE. |
| FIRST | Represents the first scan cycle following powering up of the controller. |
| OPO | OUTPUT SIGNAL - the controlled device D. |

Referring again to FIG. 1, the data accumulator 62 comprises an A-register 180, and an i-register 182. The A-register 180 is responsive to the first six bits $B_0$–$B_5$ on the lines 58, to the pluralities of processor control signals on the lines 130, 134, 136, and 140 and to output signals on a set of lines 183 from the i-register 182 to produce the accumulator output signal $a_0$. The output signal OPO is merely a buffered version of the accumulator output signal $a_0$; accordingly, it is functionally shown in FIG. 1 as being transmitted directly to the system interface 24. The illustrated embodiment of FIG. 8, however, utilizes the tristate gate 124 as the buffer so that the accumulator output signal $a_0$ is shown being transmitted to the pulse generator 68, and the output signal OPO is shown transmitted from the generator 68 to the system interface 24.

Figure 9A:
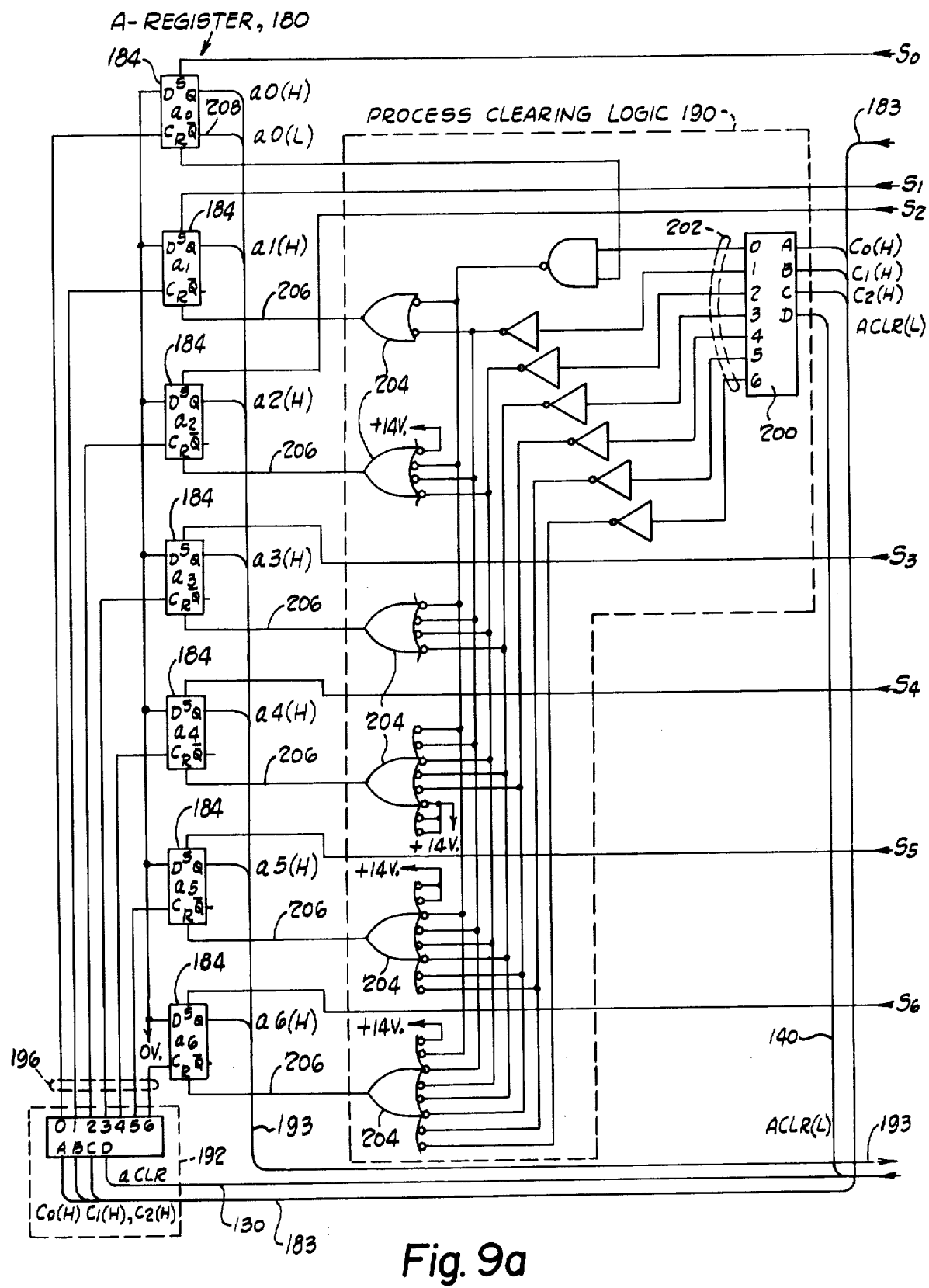
FIGS. 9a–9b are a partitioned circuit schematic of an accumulator utilized in the controller of FIG. 1.
Figure 9B:
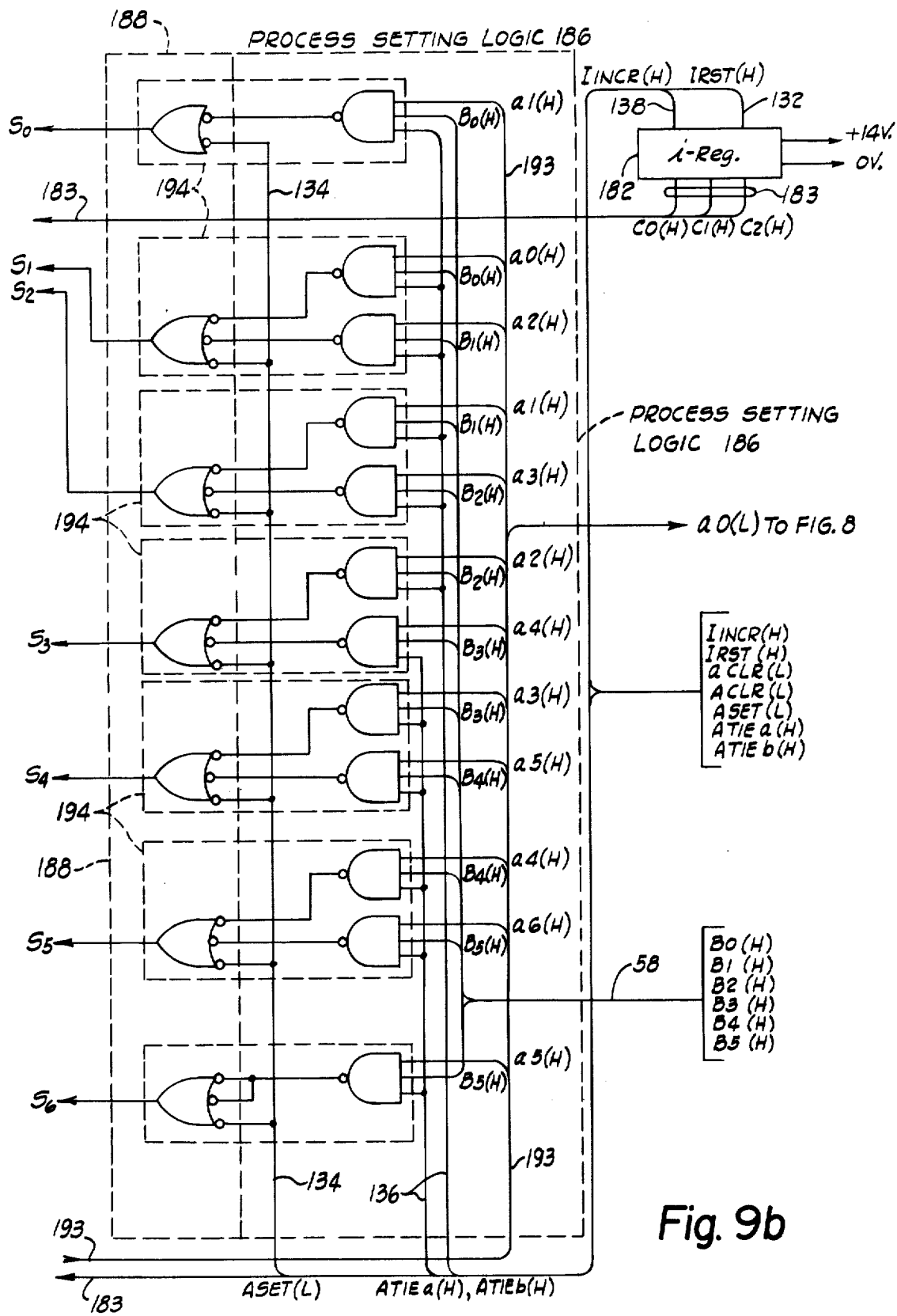

The A-register 180 and the i-register 182 are shown in detail in FIGS. 9a, 9b. The A-register 180 includes a plurality of individually programmable storage units taking the form of $n$ flip-flops 184. In the illustrated embodiment there are seven flip-flops $a_0$–$a_6$ to accommodate a ladder diagram stored within the program storage 20 having up to seven rungs.

In addition to the seven flip-flops 184, the A-register 180 includes setting logic circuitry for selectively setting the flip-flops 184 as each rung in the respective ladder diagram is sequentially tested in an operated on column. This circuitry comprises process setting logic 186, presetting logic 188 and clearing logic circuitry (FIG. 9a) which is comprised of process clearing logic 190 and input clearing logic 192. The presetting logic 188 presets the seven flip-flops 184 into a logic 1 state after a COIL instruction. The input clearing logic 192 selectively clears the flip-flops 184 corresponding to the associated rung in the ladder diagram if the rung considered is unable to contribute towards operating the controlled device D of the ladder diagram. The process clearing logic 190 clears all flip-flops 184 corresponding to unused rungs which do not have switches S in each column of the ladder diagram, thereby being unable to contribute towards operating the controlled device D connected in that ladder diagram. The process setting logic 186 sets selected ones of the flip-flops 184 according to (1) which rungs are connected in parallel in the operated on column, and (2) whether at least one rung in the parallel connected rungs is able to contribute towards operating the connected controlled device D.

The flip-flops are conventional D flip-flops sold by RCA Corporation under the numeric designation CD4013. Each of the flip-flops 184 has a set terminal connected to the setting logic circuitry, has a data terminal coupled to circuit ground, has a clock terminal coupled to the input clearing logic 192, and has a reset terminal coupled to the process clearing logic 190. The various output terminals are selectively coupled via a set of lines 193 as inputs to the process setting logic 186 for determining whether any particular rung in a set of commonly connected rungs is able to contribute towards operating the controlled device D in the particular ladder diagram.

The presetting logic 188 comprises a set of NAND gates which are responsive to the ASET signal on the line 134 generated at the end of each scan cycle for setting each of the flip-flops 184 into a logic 1 state.

The process setting logic 186 includes a plurality of $n$ logic circuits which are responsive to selected bits B of the program word on the lines 58, to the ATIE signal on the line 136, and to outputs from selected flip-flops 184 and which are coupled to the respective set terminals of the flip-flops 184. Assuming $i$ to represent the subscript of the $A_0$–$a_5$ flip-flop 184, the logic circuits 194 corresponding to the respective $a_i$ flip-flops are responsive to the bits $B_i$, $B_{i-1}$, to the outputs of the flip-flops $a_{i-1}$, $a_{i+1}$, and to the ATIE signal. Each of these logic circuits 194 sets the respective $a_1$–$a_5$ flip-flop 184 into a logic 1 state according to the expression:

$$(a_{i-a}(H) \cdot ATIE(H)) + (a_{i-1}(H) \cdot ATIE(H)) \quad \text{EQUATION 6.}$$

The logic circuit 194 corresponding to the $a_0$ flip-flop 184 is responsive to the $B_0(H)$ bit of the program word and to the output from the $a_1$ flip-flop 184 for setting the $a_0$ flip-flop according to the expression:

$$A_1(H) \cdot B_0(H) \cdot ATIE(H) \quad \text{EQUATION 7.}$$

The logic circuit 194 corresponding to the $a_6$ flip-flop 184 is responsive to the $B_5$ bit and to the output from the $a_5$ flip-flop 184 to set the $a_6$ flip-flop 184 according to the expression:

$$B_5(H) \cdot a_5(H) \cdot ATIE(H) \quad \text{EQUATION 8.}$$

The input clearing logic 192 (FIG. 9a) is a conventional 4:10 decoder which is available from RCA Corporation under the numeric designation CD4028. The decoder has its lower order inputs coupled to the *i*-register 182 via the lines 183 and has its highest order input coupled to receive the aCLR signal on the line 130. The decoder produces output signals on a set of lines 196 coupled respectively to the CLOCK input terminals of the flip-flops 184. These output signals selectively clear the flip-flops 184 corresponding to the rung considered if the switch corresponding to the rung is not indicated by the switch signals to be in its true state.

The process clearing logic 190 includes a decoder 200 having its lower order address terminals coupled via the lines 183 to the *i*-register 182 and having its highest order address terminal coupled via the line 140 to receive the ACLR(L) signal. The decoder 200 produces output signals on a set of lines 202 which are coupled to the reset terminal of the $a_0$ flip-flops 184 and to a set of logic NAND gates 204. The output signals on the lines 202 are inverted and input to the NAND gates 204 which in turn are respectively connected via a set of output lines 206 to the reset terminals of the $a_1$-$a_6$ flip-flops 184.

The decoder 200 has seven output terminals coupled to the lines 202 and corresponding to the seven flip-flops 184. The zero order output terminal is coupled for communication with all the flip-flops 184 for selectively resetting all the flip-flops 184 to a logic 0 state. The first order output terminal is coupled to the $a_1$-$a_6$ flip-flops 184 via the OR gates 204 for selectively resetting the $a_1$-$a_6$ flip-flops 184. The second order terminal is connected to the $a_2$-$a_6$ flip-flops 184 through the NAND gates 204 for resetting those flip-flops. The third order, fourth order, fifth order, sixth order, and seventh order outputs are respectively coupled via the gates 204 to the flip-flops 184 for selectively resetting the $a_3$-$a_6$ flip-flops, the $a_4$-$a_6$ flip-flops, the $a_5$-$a_6$ flip-flops and the $a_6$ flip-flop.

The lower order address inputs coupled to the lines 183 are effectively disabled by a logic 1 state of the ACLR signal on the line 140 and are effectively enabled by a logic 0 state of the ACLR(L) signal. Accordingly, when the ACLR(L) signal is generated by a TIE process word, all of the flip-flops 184 corresponding to rungs in the operated on column of the ladder diagram which do not have contacts are concurrently set into a logic 0 state.

The *i*-register 182 (FIG. 9b) is a three bit counter which provides a set of COUNT signals $C_0$, $C_1$, $C_2$ on the set of output lines 183. The three bit register is conventional; for example, a suitable counter is commercially available from RCA Corporation under the numeric designation CD4029. The counter has a count input terminal coupled to the line 138 for receiving the IINCR(H) signal and has a reset terminal coupled to the line 132 for receiving the IRST(H) signal.

In operation, the *i*-register 182 is reset by the IRST(H) signal at the end of each set of machine cycles corresponding to the completion of an operation of a column of the ladder diagram stored in the program storage 20. This corresponds to the generation of a TIE signal or a COIL signal during the $P_3$ system timing pulse or corresponds to the generation of a CLR signal following initial powering up of the controller 10. After being reset into the logic 000 state, the *i*-register is incremented in binary by the IINCR(H) signal to produce the COUNT signals $C_0$-$C_2$ having magnitudes ranging from 000–111.

Overall operation of the accumulator 62 during operation on a specific column of a ladder diagram in the program storage 20 is as follows. The seven flip-flops 184 are individually present into a logic 1 state via the ASET(L) signal on the line 134 to the presetting logic 188 at the completion of operations on a previous column. The *i*-register inputs a logic 000 state via the COUNT signals on the lines 183 to the input clearing logic 192 which, upon the occurrence of the aCLR signal, selects and clears the $a_0$ flip-flop 184. The $a_0$ flip-flop 184 is cleared if the first rung of the ladder diagram representation stored in the program storage 20 is not able to contribute towards operating the controlled device D represented in the ladder diagram. After the first rung of the ladder diagram has had the opportunity to condition the $a_0$ flip-flop 184, the *i*-register 182 is incremented by the IINCR(H) signal on the line 138 which conditions the input clearing logic 192 to select the $a_1$ flip-flop 184 for possible resetting. The $a_1$ flip-flop 184 is selectively reset upon the occurrence of a zero state of the aCLR signal on the line 130 during this machine cycle if the second rung of the ladder diagram is not able to contribute towards the operation of the particular controlled device D. At the end of this machine cycle, the *i*-register 182 is incremented by the next IINCR signal and the above process continues until all rungs of the simulated ladder diagram stored in the memory 20 and the representing contacts have had the opportunity to condition the flip-flops 184. The occurrence of a TIE process word then produces the ACLR(L) signal to be generated on the line 140 to the process clearing logic 190 which resets any remaining flip-flops 184 corresponding to the rungs in the operated on column not having any contacts. The TIE process words also produce the occurrence of the ATIE signal on the lines 136 to the process setting logic 186 which sets selective ones of the flip-flops 184 according to whether rungs in the particular column are commonly connected and whether at least one of the connected rungs is able to contribute towards operating the particular controlled device D.

More specifically, during an ATIE signal, a logic 1 in the $B_0$ bit of the TIE program word is indicative that the first and second rungs of the ladder diagram corresponding to the $a_0$, $a_1$ flip-flops 184 are commonly connected. The logic circuits 194 corresponding to the $a_0$, $a_1$ flip-flops 184 are enabled to set those flip-flops if either the outputs of these flip-flops is a logic 1. Similarly, a logic 1 in the $B_1$ bits of the program word represents that the second and third rungs in the ladder diagram corresponding to the $a_1$, $a_2$ flip-flops 184 are commonly connected. The occurrence of an ATIE signal then will set both the $a_1$, $a_2$ flip-flops to a logic 1 output if either the $a_1$, $a_2$ flip-flops 184 is a logic one. Furthermore, if the $B_0$ bit of the program word is also a logic 1, then a logic 1 in any of the first three flip-flops $a_0$, $a_1$, $a_2$ will set the $a_0$, $a_1$, $a_2$ flip-flops 184 into a logic one state. For example, if the $a$ flip-flop 184 resides in a logic 1 state while the $a_1$, $a_2$ flip-flops 184 are in a logic 0 state during a process program word which indicates that the first three rungs of the ladder diagram are commonly connected ($B_0 = B_1 =$ logic 1) then the logic 1 output of the $a_0$ flip-flops 184 causes the state of the $a_1$ flip-flop 184 to be set into the logic 1 state which, in turn, causes the state of the $a_2$ flip-flop 184 to be set into a logic 1 state.

This process continues as determined by the $B_0$–$B_5$ states of the process word for all seven flip-flops 184 for completing all operations for the operated on column. The process is repeated for each column on a rung-by-rung basis until the COIL output word is encountered. At this point, the contents of the $a_0$ flip-flop is indicative of whether the controlled device D should be operated, and it is output via a line 208 to the process control pulse generator 68 to be buffered and transmitted as the OPO output signal.

EXAMPLES

Tables III–V illustrate operation of the A-register 180 according to the ladder diagrams exemplified in FIGS. 2a–2c. In each table there is a column listing mnemonics, or symbols characterizing the structure of the particular ladder diagram; a column listing the program word generated according to the particular mnemonic and to the format shown in FIG. 3; a column representing the states of the switches corresponding to the contacts in the ladder diagram; a column representing the conditions of the associated switch signals; and there is a column showing the states of the $a_0$–$a_6$ flip-flops 184 of the A-register during conditioning.

Table III shows operation according to the ladder diagram of FIG. 2a. Referring to the first column $1C_1$ of this ladder diagram, there is a normally open set of contacts $c_1$, in the first rung $1R_1$ which is represented by a NO1 mnemonic. In the second rung $1R_2$ of the first column there are normally open contacts $c_2$, and the first and second rungs are connected in parallel, thereby requiring a TIE 1 instruction. There are normally closed contacts, $c_3$, in the second column $1C_2$ which is signified by a NC3 mnemonic and a TIE 0 mnemonic. In the third column $1C_3$ of the ladder diagram, a controlled device D100 is connected to the second column, as characterized by a COIL 100 mnemonic.

Each program word shown in the second column is generated in the format of FIG. 3 with the first four bits (the OP code) defining in binary notation the type of program word and the last six bits identifying the contacts S or controlled device D as it is located in the particular rung of the ladder diagram.

The states of the switches corresponding to the contacts $c_1$, $c_2$, $c_3$ are respectively illustrated as closed, open, and closed.

Referring now to the "A-register" column, the $a_0$–$a_6$ flip-flops 184 are all initially in a logic 1 state. These flip-flops are intially set into this state via the ASET signals upon the previous occurrence of a COIL output word. The occurrence of the NO1 word and the true state of the $S_1$ switch signal causes operation on the $a_0$

TABLE III

| MNEMONICS (FIG. 2a) | PROGRAM WORD (FIG. 2a) | SWITCH STATE | SWITCH SIGNAL | A-REGISTER $a_6$, $a_5$, $a_4$, $a_3$, $a_2$, $a_1$, $a_0$, |
|---|---|---|---|---|
| | | | | 1  1  1  1  1  1  1 |
| NO1 | 0101X0000001 | $S_1$ = Closed | TRUE | 1  1  1  1  1  1  1 |
| NO2 | 0101X0000010 | $S_2$ = Open | FALSE | 1  1  1  1  1  0  1 |
| TIE 1 | 0110X0000001 | | | 0  0  0  0  0  1  1 |
| NC3 | 0100X0000011 | $S_3$ = Closed | FALSE | 0  0  0  0  0  1  0 |
| TIE 0 | 0110X0000000 | | | 0  0  0  0  0  0  0 |
| COIL 100 | 0111X1100100 | | | 1  1  1  1  1  1  1 |

TABLE IV

| MNEMONICS (FIG. 2b) | PROGRAM WORD (FIG. 2b) | SWITCH STATE | SWITCH SIGNAL | A-REGISTER $a_6$, $a_5$, $a_4$, $a_3$, $a_2$, $a_1$, $a_0$, |
|---|---|---|---|---|
| | | | | 1  1  1  1  1  1  1 |
| NO1 | 0101X0000001 | $S_1$ = Closed | TRUE | 1  1  1  1  1  1  1 |
| NO2 | 0101X0000010 | $S_2$ = Open | FALSE | 1  1  1  1  1  0  1 |
| TIE 1 | 0110X0000001 | | | 0  0  0  0  0  1  1 |
| NC3 | 0100X0000011 | $S_3$ = Closed | FALSE | 0  0  0  0  0  1  0 |
| NO4 | 0101X0000100 | $S_4$ = Closed | TRUE | 0  0  0  0  0  1  0 |
| TIE 1 | 0110X0000001 | | | 0  0  0  0  0  1  1 |
| COIL 110 | 0111X1101110 | | | 1  1  1  1  1  1  1 | bit of the A-register which leaves the $a_0$ bit in a logic 1

TABLE V

| MNEMONICS (FIG. 2c) | PROGRAM WORD (FIG. 2c) | SWITCH STATE | SWITCH SIGNAL | A-REGISTER $a_6$, $a_5$, $a_4$, $a_3$, $a_2$, $a_1$, $a_0$, |
|---|---|---|---|---|
| | | | | 1  1  1  1  1  1  1 |
| NO1 | 0101X0000001 | $S_1$ = Closed | TRUE | 1  1  1  1  1  1  1 |
| NO2 | 0101X0000010 | $S_2$ = Open | FALSE | 1  1  1  1  1  0  1 |
| NC5 | 0100X0000101 | $S_5$ = Open | TRUE | 1  1  1  1  1  0  1 |
| TIE 1 | 0110X0000001 | | | 0  0  0  0  1  1  1 |
| NC3 | 0100X0000011 | $S_3$ = Closed | FALSE | 0  0  0  0  1  1  0 |
| SPACE | 0011XXXXXXXX | | | 0  0  0  0  1  0  0 |
| LINE | 0010XXXXXXXX | | | 0  0  0  0  1  0  0 |
| TIE 3 | 0110X0000011 | | | 0  0  0  0  1  1  1 |
| COIL 120 | 0111X1111000 | | | 1  1  1  1  1  1  1 | state, since the input switch $S_1$ is in its closed state. Specifically, the aCLR (L) signal is generated to have a logic one state during the 001 state of the $i$-register 182. The NO1 word also generates the IINCR signal which causes the $i$-register 182 to increment by 1 in preparation for the NO2 input word and the processing of the second rung of the simulated ladder diagram. The NO2 input word conditions the $a_1$ bit of the A-register into a logic 0 state because the switch $S_2$ does not reside in its closed state, producing a false switch signal. The NO input word also increments the $i$-register 182. The conditioning of the $a_1$ bit is accomplished by the generation of the aCLR (L) signal having a logic zero state during the 010 state of the $i$-register 182. The TIE 1 program word resets the bits $a_2$–$a_6$ to a logic 0 state since no contacts were represented in the rungs $1R_2$–$1R_7$. This is accomplished by the ACLR signal during the 011 state of the $i$-register 182. The TIE 1 word also generates the ATIE signal which, in combination with a binary one in the bits $B_0$–$B_5$, causes the $a_0$, $a_1$ flip-flop to each be set into a logic 1 state since one of them, the $a_0$ flip-flop previously resided in a logic 1 state. The TIE program word alo generates the IRST signal which resets the $i$-register 182 so that the next program word, representing the first rung in the second column of the simulated ladder diagram, operates on the $a_0$ flip-flop.

Operation by the ACLR, aCLR, ATIE, IINCR, and IRST signals on the second column of the ladder diagram is generally similar to that on the first column and will not be further described. The next program word in the sequence is the NC3 program word which resets the $a_0$ bit to a logic 0 because the state of the input switch $S_3$ is closed and the NC program word indicates that the open state produces a true switch signal. The NC3 program word also increments the $i$-register. The TIE word clears the $a_1$–$a_6$ flip-flops because no contacts are represented in the $1R_2$–$1R_7$ rungs in the 1C column of the ladder diagram. The occurrence of the COIL 100 word causes the state of the $a_0$ flip-flop, a logic 0 bit, after processing due to the TIE word, to be transferred as the output signal OPO for controlling the device D100. The COIL word also resets the $i$-register 182 and the A-register in the preparation for the next ladder diagram.

Table IV represents operation of the accumulator 62 according to the ladder diagram illustrated in FIG. 2b. The ladder diagram of FIG. 2b is similar to that of FIG. 2a except that a pair of normally open contacts $c_4$, are connected in parallel with the contacts $c_3$ in the second column $2C_2$. Also the controlled device D in column $2C_3$ has a location number 110 in FIG. 2b. The sensed conditions (the states of the switch signals) of the input switches $S_1$, $S_2$, $S_3$ are the same as in Table III. The sensed condition of the input switch $S_4$ is selected to be closed.

In the first column in Table IV, the mnemonics for the ladder diagram of FIG. 2b are the same as those of Table III through the fourth word, NC3 and need not be further explained. After the fourth word NC3, a NO4 word is shown. The NO4 word is the second input word following a first TIE process word which characterizes the ladder diagram of FIG. 2b to have a normally open pair of contacts in the second rung of the second column associated with an input switch of location number 4. Because the outputs of the contacts $c_3$, $c_4$ are commonly connected, a TIE 1 instruction word follows the NO4 word and indicates that the first and second rungs are commonly connected. The last word in the first column of Table III is a COIL 110 which defines the location to be 110 of the controlled device.

Because the ladder diagrams of FIGS. 2a, 2b and the switch signals are the same through the NC3 program word, operation of the respective A-register is also the same through the NC3 program word and is not further described. The NO4 program word and the closed state of the $S_4$ switch allows the $a_1$ flip-flop to remain in a logic 1 state since the input switch $S_4$ is thus true. The occurrence of the TIE 1 signal causes the $a_0$, $a_1$ flip-flops to both be set into the logic 1 state since, after the processing due to the NO4 word, the $a_1$ flip-flop resided in a logic 1 state. Upon the occurrence of the COIL 110 word, the state of the $a_0$ flip-flop, a logic 1 state, after processing due to the TIE 1 signal, is coupled to the controlled system 12 as the OPO output signal for operating the controlled device 110.

Table IV illustrates operation of the ladder diagram illustrated in FIG. 2c. The ladder diagram of FIG. 2c is similar to that in FIG. 2a, except normally closed contacts $c_5$ are connected in parallel with the contacts $c_1$, $c_3$ in the first rung $3R_1$ in the first and second columns, respectively. The controlled device 16 is shown to be device 120. The sensed conditions of the input switches $S_1$, $S_2$, $S_3$ are the same as in FIGS. 2a and 2b, and the $S_5$ switch signal is a logic 0.

The mnemonics and the operation of the A-register for the ladder diagram of FIG. 2c is the same as that of the ladder diagram of FIG. 2a through the NO1, NO2 program words. The third mnemonic is a NC5 program word presenting the normally closed contact $c_5$ in the third rung of that column. The NC5 word and the open state of the $S_5$ switch allows the $a_5$ flip-flop to remain the logic 1 state since the input switch signal is true. The next mnemonic is a TIE 1 representing that the contact $c_5$ is the contact in the first column and that the first and second rungs in that column are commonly connected. This causes the state of the $a_3$–$a_6$ flip-flops to be a set to a logic 0 state and causes the states of the $a_0$–$a_2$ flip-flops all to be set into the logic 1 state. The next mnemonic is a NC3 which resets the $a_0$ flip-flop to a logic 0 since the state of the input switch $S_3$ is closed, producing a false switch signal. The next mnemonic is a SPACE which resets the $a_1$ flip-flop to a logic 0 state, corresponding to the lack of a contact in the second rung of the second column. The next word is a LINE which allows the state of the $a_2$ flip-flop to remain in the logic 1 state since a LINE contributes towards operating the device D120. The next word is a TIE 3 which indicates that no contacts are in the $3R_4$–$3R_7$ rungs in the second column and that the first through third rungs are commonly connected. This causes the $a_0$–$a_2$ flip-flops all to be set into a logic 1 state since the $a_2$ flip-flop was previously in a logic 1 state. The occurrence of the COIL 120 program word after the TIE 3 word indicates that the device at location 120 is commonly connected to the first through third rungs. The logic 1 state of the $a_0$ flip-flop after processing due to the TIE 3 word, is coupled to the controlled system 12 as the OPO output signal for operating the controlled device at location 120.

Referring again to FIG. 1, the system interface 24 includes a data synchronizer circuit 210 and a controlled system selector circuit 212. The system selector circuit 212 is conventional interface circuitry which is directly coupled to the input switches S and to the controlled devices D in the controlled system 12. The switch signals IPO from the input switches S are input to the programmable controller 10 through the selector circuit 212, and the output signals OPO are output to the controlled devices D through the selector circuit 212.

A preferred selector circuit 212 is of the multiplex type wherein a plurality of lines (although only a single line is shown in FIG. 1) couple the input switches S and the selector circuit 212. Commercially available data selector circuitry which selects a certain line according to encoded signals supplied to input terminals on the data selector devices are employed for selecting the particular line from the input switches S. For example, a model MC14512 data selector from Motorola, Inc., is suitable for multiplexing up to eight devices. For numbers of devices greater than eight, a number of the MC14512 data selector may be multiplexed together. A similar demultiplexing scheme for distributing the output signals to the devices D can be one or more CD4028 decoders from RCA, Inc. The bits $B_0$-$B_6$ of the program word on the line 58 are the encoded signals which select the particular line going to one of the input switches S or to one of the devices D.

The data synchronizer 210 is a feature of the invention which alternatively allows data input into the programmable controller 10 to be processed by the process control pulse generator 68 either during the scan cycle during which it was input, or alternately to be processed during the next in sequence scan cycle. This feature is particularly advantageous in those controlled systems 12 whereby a change of state of one of the input switches S during a particular scan cycle could render an erroneous output command to the controlled system 12. For example, some controlled systems 12 have latch circuits for their devices D which, if improperly set during one scan cycle, could initiate an entirely improper sequence of operation of the devices D during subsequent scan cycles. The preferred embodiment of the data synchronizer circuit 210 efficiently obviates this possibility with a minimum of technical complexity and with a minimum of economic cost by using a random access memory (hereafter RAM) 220 as a buffer storage element.

Figure 10:
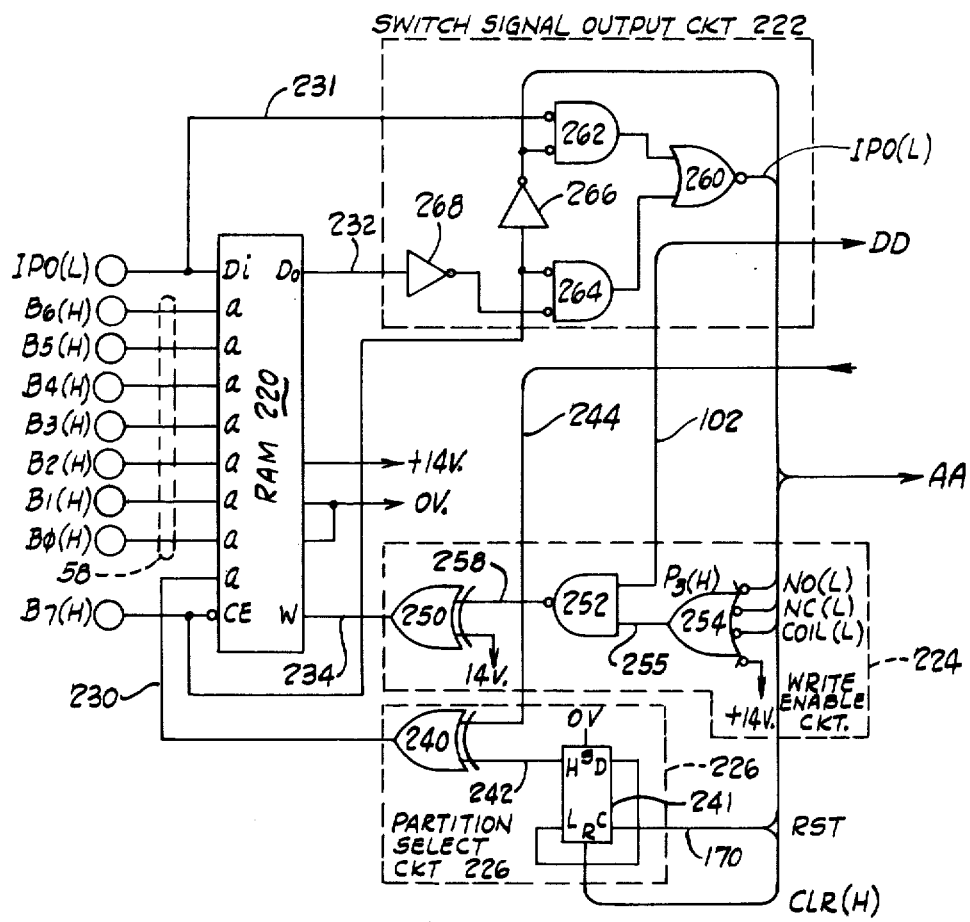
FIG. 10 is a circuit schematic illustrating a data sychronizer circuit utilized in the controller of FIG. 1; and, FIG. 11 is a circuit schematic illustrating a level shifter circuit utilized in the program storage circuit of FIG. 4.

The preferred embodiment of the data synchronizer circuit 210 utilizing the RAM 220 is shown in FIG. 10. In addition to the RAM 220, the data synchronizer circuit 210 includes a switch signal output circuit 222, a write enable circuit 224, and a partition select circuit 226. The RAM 220 has a set of address terminals, all but the highest order address terminal being coupled to receive the $B_0$-$B_6$ bits of the program word on the lines 58. The highest order input terminal is coupled by a line 230 to the partition select circuit 226.

The RAM 220 also has an enable terminal CE, and the bit $B_7$ of the program word is coupled to the enable terminal to selectively enable the RAM to provide synchronous operation. By providing a logic 0 state in the bit $B_7$ of the program word, the RAM 220 is enabled to provide synchronous operation. Conversely by providing a logic 1 in the bit $B_7$ of the program word, the RAM 220 is disabled, effectively removing input signal storage and allowing the switch signal IPO to be directly and asynchronously input into the switch signal output signal 222.

The RAM 220 also has an input terminal $D_t$, and the input terminal is coupled to receive the switch input signals on a line 231 from the system selector circuit 212. An output terminal of the RAM 220 is coupled by a line 232 as an input to the switch signal output circuit 222. A write enable terminal W of the RAM 220 is coupled by a line 234 to the write enable circuit 234 for enabling current switch signal data to be written into a selected location of the RAM 220.

By connecting the highest order address terminal of the RAM 220 via the line 230 to the partition select circuit 226, the RAM 220 is effectively partitioned into first and second groups of storage locations. By providing a logic 0 state to the highest order address location, the partition select circuit 226 selects the group having the lower addressed storage locations. Conversely, by providing a logic 1 state to the highest order address bit, the partition select circuit selects the group having the higher addressed storage locations.

The partition select circuit 226 includes an exclusive OR gate 240 and a D flip-flop 241. The D flip-flop 241 is a complementing flip-flop which has its CLOCK terminal coupled to the RST signal on the line 170 and has its high output terminal coupled via a line 242 to the gate 240. Its data input terminal is connected to its low output terminal such that upon the occurrence of a RST signal at the end of each scan cycle, an output signal on the line 242 is produced which changes logic states for each scan cycle.

The exclusive-OR gate 240 is responsive to the output signal on the line 242 from the flip-flop 241 and to a logic combination of the output signals on a line 244 from the counter 74 in the system timing pulse generator 66. The signal on the line 244 is generated every machine cycle at an approximate duty cycle of 25% and is generated immediately prior to the $P_3$ system timing pulse. Accordingly, the partition select signal on the line 230 is generated to change state at the beginning and end of every $P_3$ system timing pulse and, due to the signal on the line 42, to have its values complemented during alternate scan cycles. This results in the partition select signal having a 25% duty cycle during even scan cycles and a 75% duty cycle during odd scan cycles.

The write enable circuitry 224 includes an exclusive OR gate 250 coupled to the write enable terminal of the RAM 220 via the line 234, a NAND gate 252, and a NAND gate 254. The NAND gate 254 is responsive to the NO(L) signal, to the NC(L) signal, and to the COIL(L) signal. Whenever one of these signals has been generated according to the respective program words, the gate 254 generates a signal to the NAND gate 252 via a line 255. The $P_3$ system timing pulse is also input to the gate 252 via the line 102 for enabling the signal on the line 255 to be input on a line 258 to the exclusive OR gate 250. The exclusive OR gate 250 has one input coupled to a logic 1 voltage level so that the output from the NAND gate 252 generates the write enable signal on the line 234 during every $P_3$ system timing pulse whenever a NO, a NC, or a COIL instruction word is encountered during each machine cycle. Accordingly, the RAM 220 is enabled for writing during any one of these conditions for allowing the IPO switch signals to be written into one of the storage locations as determind by the partition select circuit 226.

It is thus apparent that the operation of the write enable circuit 224 and the partition select circuit 226 causes the switch signals IPO to be written into one group of storage locations during one scan cycle, to be read from the other group of locations during the same scan cycle, to be written into the other group of storage locations during the next scan cycle, to be read out of the one group of storage locations during the same next scan cycle, and so forth. In other words, during the synchronous mode of operation, the switch signals IPO from the input switches S are input into buffer storage, are stored, and are then read out next scan cycle. This assures that none of the IPO switch signals input to the processor control pulse generator 68 will change during a given scan cycle.

The switch signal output circuit 222 comprises an output NOR gate 260, a pair of NOR gates 262, 264 having their outputs connected as inputs to the NOR gate 260, and a pair of inverters 266, 268. The inverter 268 couples the output terminal of the RAM 220 via the line 232 to one input of the NOR gate 264. The inverter 266 is connected to one input of the NOR gate 262, to another input of the NOR gate 264, and to the enable terminal of the RAM 220 for receiving the B bit of the program word. The other input of the NOR gate 262 is coupled by line 231 to the data input terminal of the RAM 220 for receiving the IPO switch signals.

As mentioned previously, the $B_7$ bit of the program word determines synchronous or asynchronous operation. It enables or disables the RAM 220 and also enables one of the gates 262, 264 while disabling the other gate via the inverter 266. Accordingly, if the $B_7$ bit is a logic 1, asynchronous operation is ordered, and the RAM 220 is bypassed. The gate 262 is then enabled to allow the IPO switch signals to pass through the NOR gate 260 as the IPO(L) signals. Conversely a logic 0 in the $B_7$ bit of the program word enables the RAM 220, disables the gate 262 and enables the NOR gate 264 to allow data to be output from the RAM on the line 232. This data is transmitted to the processor control pulse generator 68 through the NOR gate 260 as the IPO(L) signals.

It will thus be appreciated that a new and improved programmable controller has been described for operating controlled systems whose desired operation may be characterized by planar ladder diagrams. The invention provides for simplified programming by allowing simulated ladder diagram representing the desired operation to be directly stored into the program memory, thereby facilitating programming of the controller. The controller operates at high speed and is of a simplified design having an accumulator with a plurality of storage units which is ideally suited for accommodating operation according to the ladder diagram representations stored in memory. The controller is versatile and provides either synchronous or asynchronous system operation using a unique input buffer storage circuit.

Although the invention has been described with a certain degree of particularity, it is understood that the description of the preferred embodiment has been only by way of example. For example, rather than setting the accumulator in states corresponding to operation of the device and selectively resetting the accumulator if the switch signals are indicative of nonoperation of the device, the accumulator could be reset into states corresponding to nonoperation and then selectively reset if the switch signals are indicative of operation. Likewise, the set of input switches need not be normally open, but could be normally closed when used with an inverter or other equivalent modifications. Numerous other changes will be apparent to those reading the specification without departing from the spirit and the scope of the invention as claimed.

What is claimed is:

1. A sequence controller for selectively operating at least one controlled device in a controlled system in response to the operating status of a set of switches in the system, the switches being operated in response to the operation of the system, and the operation of the system being characterized by a ladder diagram which represents a connection, in an $n$rung-by $m$ column array, of the controlled device with a plurality of binary elements corresponding to said switches, comprising:
  a. a system interface responsive to the switches for deriving switch signals having which are indicative of the operating status of each of the switches;
  b. program storage means responsive to a set of timing signals for storing and providing a sequence of program words which represents said connection of binary elements and controlled device in said ladder diagram, said sequence of program words thereby characterizing the desired operation of the controlled device;
  c. data processing means for producing an output signal in response to the sequence of program words and to the switch signals for effecting operation of the selected controlled device, the data processing means including:
   i. an accumulator having a plurality of at least $n$storage units individually conditionable in response to a set of processor signals, said storage units being effective to provide said output signal,
   ii. process signal generating means responsive to the sequence of program words and to the switch signals for generating the set of processor signals and the set of timing signals, the processor signals representative of whether the values of the switch signals are indicative that the corresponding binary elements in the planar array would contribute towards operating said controlled device; and
   iii. timing means responsive to said set of timing signals for selecting the storage unit of said accumulator to be conditioned by said processor signals, whereby the selected storage unit after having been conditioned by the processor signals is indicative whether the binary element corresponding to said storage unit would contribute, as determined by the value of the corresponding switch signals, towards operating the controlled device.

2. A sequence controller according to claim 1 and including output means for selectively coupling the output signal to the machine for operating the controlled device.

3. The programmable sequence controller according to claim 1 wherein the binary elements are contacts of first and second types and selected program words have a first set of bits which specify the type of contacts and a second set of bits which specify the address location in the system of the respective switches corresponding to the associated contacts.

4. The sequence controller according to claim 1 wherein each storage unit is an independently presettable flip-flop.

5. The sequence controller according to claim 1 wherein the timing means includes a system timing pulse generator for periodically producing a set of system timing pulses as said timing signals, the period of the set of system timing pulses defining a machine cycle during which a program word is output from program storage 6. The sequence controller according to claim 1 wherein the set of switches are binary switches, all having a like normal state as coupled to the system interface.

7. The sequence controller according to claim 1 wherein the system interface includes a buffer register for storing the switch signals during one sequence of the program words and for transmitting the stored switch signals during the next sequence of program words, the buffer register having at least first and second groups of switch signal storage locations.

8. The sequence controller according to claim 7 wherein the system interface further includes selector means responsive to the timing signals and to the processor signals for selecting one group of storage locations for writing the switch signals into the buffer register and for selecting another group of storage locations for reading switch signals out of the buffer register.

9. The sequence controller according to claim 8 wherein the timing means includes means for generating an end porgram signal upon the occurrence of the last program word in the sequence, and the selector means comprises means responsive to the end program signal for selecting which of the groups of storage location the switch signals are written into and read out of.

10. The sequence controller according to claim 7 and further including disable means responsive to the sequence of program words for selectively disabling the buffer register.

11. The sequence controller according to claim 10 wherein the buffer register comprises a random access memory.

12. A sequence controller for selectively operating at least one controlled device in a controlled system in response to the operating status of a set of switches in the system, the switches being operated in response to operation of the system, and the operation of the system being characterized by a ladder diagram which represents a connection, in an $n$rung-by $m$column array, of the controlled device with a plurality of binary elements corresponding to said switches, comprising:
 a. input means responsive to the switches for deriving switch signals having values which are indicative of the operating status of each of the switches;
 b. program storage means responsive to a set of timing signals for storing and providing a sequence of program words which represents said connection of binary elements and controlled device in said ladder diagram, said sequence of program words thereby characterizing the desired operation of the controlled device on a rung by rung basis for each of the $m$ columns;
 c. an accumulator having a plurality of at least $n$ storage units which are individually conditionable in response to a set of switch conditioned signals and to a set of array conditioned signals and which respectively correspond to a rung in the planar array, the accumulator being responsive to the program words for producing an output signal which operates the controlled devices as a function of the values stored by the individual storage units;
 d. process signal generating means for producing the timing signals, for producing the switch conditioned signals, in response to the program words and to the switch signals, and for producing the array conditioned signals in response to the program words;
 e. timing means responsive to said set of timing signals for selecting the storage unit, corresponding to the rung represented by a given program word, to be conditioned by said switch conditioned signals, whereby the selected storage unit after having been so conditioned is indicative whether said rung would contribute towards operating said controlled device;
 f. logic circuitry responsive to the program words for reconditioning the values of storage units in the accumulator according to the values of other storage units; and
 g. output means coupled to the accumulator for providing the output signal to the controlled system, the value of one storage unit determining whether the controlled device should be operated.

13. The sequence controller according to claim 12 wherein the accumulator includes:
 a setting logic circuitry responsive to the array conditioned signals for presetting the individual storage units prior to the beginning of a sequence of the program words;
 b. array clearing logic circuitry responsive to the array conditioned signals for clearing selected ones of the storage units corresponding to rows in a column of the planar array not having binary elements represented therein; and
 c. switch clearing logic circuitry responsive to the switch conditioned signals for clearing the corresponding storage units if the binary elements in a given rung of the planar array cannot contribute toward operating the respective controlled device.

14. The sequence controller according to claim 13 wherein the switch clearing logic circuitry includes a decoder responsive to the timing signals for sequentially enabling selective clearing of the storage units.

15. The sequence controller according to claim 12 wherein the switches are binary switches, all having a like normal state as coupled to the input means.

16. The sequence controller according to claim 12 wherein the program storage means includes:
 a. a programmable read only memory for storing the program words and producing the stored program words in response to program address signals; and,
 b. a program address generator for producing a sequence of program address signals to the programmable read only memory.

17. The sequence controller according to claim 12 wherein the input means includes a buffer register for selectively storing the set of switch signals during one sequence of program words and for transmitting the set of stored switch signals during the next sequence of program words.

18. The sequence controller according to claim 17 wherein the buffer register includes:
 a. at least first and second groups of storage locations; and,
 b. select means for writing the switch signals into one group of storage locations during one sequence of program words and for reading the set of stored switch signals from another group of the storage locations during the same sequence of program words.

19. A sequence controller for selectively operating at least one controlled device in a controlled system in response to operating status of a set of switches in the system, the switches being operated in response to operation of the system, and the operation of the system being characterized by a ladder diagram which represents a connection, in an n rung-by m column array, of the controlled device with a plurality of binary elements corresponding to said switches, comprising:
   a. input means responsive to the switches for deriving switch signals having values which are indicative of the operating status of each of the switches;
   b. program storage responsive to a set of timing signals for storing and providing a sequence of program words representing the planar ladder diagram, said sequence including input words having bits representing the type of each binary element and the location of the associated switch, process words having bits representing the interconnection of the binary elements, and output words having bits representing the interconnection of the selected controlled device with the binary elements, the sequence of program words thereby characterizing the ladder diagram on a rung by rung basis for each of the m columns;
   c. an accumulator having a plurality of storage units for providing an output signal as a function of the values of the storage units, the storage units being individually conditionable in response to a set of processor signals to thereby provide the output signal indicative of whether the states of the binary elements would effect operation of the selected controlled device as it is connected in the ladder diagram;
   d. process signal generating means responsive to the sequence of program words and to the switch signals for generating the set of processor signals and the set of timing signals, the processor signals representative of whether the values of the switch signals are indicative that the corresponding binary elements in the planar array would contribute towards operating said controlled device;
   e. timing means responsive to said set of timing signals for selecting the storage unit of said accumulator to be conditioned by said processor signals, the selected storage unit corresponding to the rung of the ladder diagram then represented by said program words, whereby the selected storage unit having having been conditioned by the processor signals is indicative whether the binary element corresponding to said storage unit would contribute, as determined by the value of the corresponding switch signals, towards operating the controlled device;
   f. output means for selectively coupling the output signal to the machine for operating the controlled device.

20. The sequence controller according to claim 19 wherein the switches are binary switches, all having a like normal state as coupled to the input means.

21. The sequence controller according to claim 20 wherein the accumulator comprises:
   a. a plurality of n flip-flops corresponding to the n rungs; and,
   b. setting circuit means for setting respective ones of the flip-flops into a desired state in response to the processor signals.

22. The sequence controller according to claim 21 wherein the processing signal generating means includes a pulse generator for producing a set of array conditioned processor signals in response to processing words from the program storage means and includes another pulse generator for producing a set of switch conditioned processor signals in response to input words and switch signals.

23. The sequence controller according to claim 22 wherein the setting circuit means includes:
   a. presetting logic circuitry for presetting all flip-flops prior to the beginning of a sequence of the program words;
   b. process setting logic circuitry responsive to the array conditioned processor signals for setting the flip-flops which are indicated by the process words to correspond to binary elements which are interconnected in a column of the ladder diagram when one of the indicated flip-flops is in the set state;
   c. input clearing logic circuitry responsive to the switch conditioned processor signals for clearing the slip-flops corresponding to rungs of the ladder diagram which cannot contribute toward operating the controlled device because the switch signals are indicative of the corresponding binary elements representing a nonconductive state; and,
   d. process clearing logic circuitry responsive to the array conditioned processor signals for clearing the flip-flops corresponding to those rungs in a column of the ladder diagram in which a binary element is not represented.

24. The sequence controller according to claim 23 wherein the timing means includes an incrementing register for sequentially enabling the flip-flop which corresponds to the rung of the ladder diagram which is represented by the specific program word as they are output from the program storage means.

25. The sequence controller according to claim 24 wherein the process setting logic circuitry includes a plurality of logic circuits coupled to outputs of selected ones of the flip-flops and connected to receive selected bits of the program words for setting the states of the flip-flops indicated by the process word, whereby the setting of one of indicated flip-flops, causes the setting of the other of the indicated flip-flops.

26. A method of sequentially operating a controlled device in a system in accordance with the conditions of a plurality of switches in the system, the switches being operated by operation of the system, wherein a planar ladder diagram is provided in which a plurality of binary elements, each associated with a respective one of the switches, are interconnected with the controlled device, said binary elements each being represented in a normal state and arranged in a plurality of rows in the diagram with individual binary elements of the rows arranged in respective columns of the diagram and said controlled device being disposed in one of said rows by itself in an end column of the diagram, and wherein there are a plurality of individually conditionable storage units corresponding in number to the number of rows of said diagram, comprising:
   a. storing in memory and producing therefrom a sequence of program words which directly represent the individual binary elements, their normal states, and the controlled device, wherein the program words are arranged to characterized the interconnection in a row-by-row sequence proceeding column by column to said end column;
   b. producing a series of switch status signals indicative of the actual status of said switches;
   c. conditioning successive storage units in response to said sequence of program words and in response to said switch status signals, the conditioned storage units thereby indicating whether the binary elements in successive rows of each column would contribute as determined by the value of the switch status signals corresponding to the respective binary elements, to operation of said controlled device as connected in said ladder diagram;

d. detecting the condition of the storage unit corresonding to the row in which said controlled device is disposed in said end column; and e. producing an output signal for operating said controlled device in accordance with the condition of said storage unit corresponding to the row and column to said controlled device.

27. A method of sequentially controlling operating of a controlled device in a controlled system in response to operating status of switches in the controlled system, the switches being operated in response to operation of the system, wherein there are a plurality of individually conditionable storage units and a ladder diagram which defines an interconnection in rungs and columns of the controlled device with binary elements, each binary element associated with one of the switches, the ladder diagram selected to characterize operation of the controlled device according to the states of the binary elements, comprising the steps of:

a. generating a sequence of program words representing the planar ladder diagram in a rung by rung sequence for successive columns;

b. sensing the operating status of the switches corresponding to the binary elements and providing a plurality of switch signals indicative of said operating status;

c. generating in response to the program words and to the switch signals a plurality of processor control signals indicative of whether the switches corresponding to the binary elements in respective rungs of a given column are in a logic state which would effect operation of the controlled device as determined by the ladder diagram;

d. associating respective ones of the plurality of storage units with corresponding rungs of the ladder diagram;

e. selectively conditioning the plurality of individually programmable storage units in response to the process control signals; and, f. logically combining the values of the storage units to provide an output signal for selectively operating the controlled device.

28. The method of controlling according to claim 27 wherein the step of generating a sequence of program words includes the steps of generating an input program word indicative of the type of the respective binary elements and the locations of their associated switches in the controlled system, a process word indicative of the common connection of rungs in a particular column in the ladder diagram, and output words indicative of the connection of a particular controlled device in the ladder diagram.

29. The method of controlling according to claim 28 wherein the step of selectively conditioning includes the step of sequentially enabling each one of the conditionable storage units to be conditioned according to (1) whether a binary element is in the corresponding rung of the ladder diagram and (2) whether the associated switch signal is indicative of the binary element being conductive.

30. The method of controlling according to claim 29 wherein the step of logically combining comprises the step of setting the state of a predetermined one of the flip-flops according to the states of the flip-flops corresponding to the binary elements which the program words indicate are commonly connected to the binary element corresponding to said one flip-flop and to the controlled device in the ladder diagram.

31. The method of controlling according to claim 27 wherein the step of selectively conditioning comprises the steps of:

a. presetting all storage units prior to said step of generating a sequence of program words;

b. selectively resetting all of the storage units corresponding to rungs of the ladder diagram which cannot contribute towards operating the controlled device;

c. selectively setting the states of all storage units corresponding to rungs in a column of the ladder diagram which are commonly connected and have at least one rung able to contribute toward operating the controlled device; and, d. repeating steps a, b, and c for each column in the ladder diagram until the column containing the controlled device is encontered.

32. The method of controlling according to claim 27 wherein the complete set of the program words corresponds to a scan cycle, and the step of sensing the operating status includes the step of storing the values of the switch signals during one scan cycle and reading the values of the stored switch signals during a next-in-sequence scan cycle.

33. The method of controlling according to claim 32 wherein the step of storing includes the steps of:

a. providing at least first and second groups of storage locations; and, b. writing values of the switch signals into one group during one scan cycle and reading values of the switch signals from another group during the same scan cycle.

34. In a sequence controller for selectively operating a controlled device in a controlled system in response to the operating status of a set of switches in the controlled system, the switches being operated by operation of the system, the controller having system interface means for coupling to the switches and deriving switch signals indicative of the operating status of the switches, program storage means for storing and providing a sequence of program words representing states of selected switches during each of a series of scan cycles, and processing means responsive to the switch signals and to the program words for producing an output signal which controls operation of the controlled device, the improvement wherein the system interface means comprises:

a. storage means having a plurality of addressable storage locations which are effectively partitioned into at least first and second groups of locations for storing values of the switch signals; and b. control means for selectively writing the values of the switch signals into one group of locations during a first scan cycle, writing into a second group during a next-in-series second scan cycle, and for reading the values of the switch signals out of the one group during the next-in-series second scan cycle.

35. The improved programmable controller according to claim 34 and further including:

a. disable means responsive to the program words for selectively disabling the storage means; and, b. means coupled to the disable means for selectively inputting the switch signals to the processing means during the same scan cycle during which the switch signals are derived.

36. The improved programmable controller according to claim 34 wherein the storge means is a random access memory having a data input, a data output, and multiple address inputs including a highest order address input.

37. The improved programmable controller according to claim 36 wherein the controlled means includes selector circuitry coupled to the highest order address input for selecting which of the groups of the addressed storage units the values of the switch signals are to be written into and read out of.

38. The improved programmable controller according to claim 37 wherein the selector circuitry is responsive to the program words for altering the sequence of reading and writing into the groups so that values of the switch signals are not written into the same group during successive scan cycles.

39. The improved programmable controller according to claim 38 wherein the selector circuitry is also responsive to the program word for altering the sequence of reading and writing into the groups so that values of the switch signals are not read out of the same group during successive scan cycles.

40. The improved programmable controller according to claim 36 wherein the random access memory also includes a write input and further including write enable circuitry which is coupled to the write input and is responsive to the program word for selectively enabling the values of the switch signals to be written into the random access memory only upon the occurrence of certain types of program words.

41. The improved programmable controller according to claim 40 including:

a. timing means for generating a set of noncoincident periodic timing pulses which define a machine cycle, and said program storage means is coupled to said timing means for transmitting one instruction word during each machine cycle; and, b. the write enable circuitry is responsive to one of said timing pulses of the machine cycle and the selector circuitry is responsive to another of said timing pulses of the machine cycle.

* * * * *